(12) United States Patent
Takahashi et al.

(10) Patent No.: US 10,174,217 B2
(45) Date of Patent: Jan. 8, 2019

(54) INK, INK STORED CONTAINER, IMAGE FORMING METHOD, LIQUID DISCHARGING APPARATUS, AND IMAGE

(71) Applicants: Hiroaki Takahashi, Kanagawa (JP); Michihiko Namba, Kanagawa (JP); Kiminori Masuda, Tokyo (JP); Amika Sagara, Tokyo (JP)

(72) Inventors: Hiroaki Takahashi, Kanagawa (JP); Michihiko Namba, Kanagawa (JP); Kiminori Masuda, Tokyo (JP); Amika Sagara, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 66 days.

(21) Appl. No.: 15/363,794

(22) Filed: Nov. 29, 2016

(65) Prior Publication Data

US 2017/0158892 A1 Jun. 8, 2017

(30) Foreign Application Priority Data

Dec. 4, 2015 (JP) .................................. 2015-238046

(51) Int. Cl.
| | | |
|---|---|---|
| *C09D 11/033* | (2014.01) | |
| *C09D 11/102* | (2014.01) | |
| *C09D 11/107* | (2014.01) | |
| *C09D 11/326* | (2014.01) | |
| *C09D 133/10* | (2006.01) | |
| *B41J 2/175* | (2006.01) | |

(52) U.S. Cl.
CPC ............. *C09D 11/107* (2013.01); *B41J 2/175* (2013.01); *C09D 11/033* (2013.01); *C09D 11/102* (2013.01); *C09D 11/326* (2013.01); *C09D 133/10* (2013.01)

(58) Field of Classification Search
CPC ... C09D 11/033; C09D 11/102; C09D 11/107; C09D 11/326; C09D 133/10; B41J 2/175
USPC .......................... 523/160; 524/507, 589, 599
See application file for complete search history.

(56) References Cited

U.S. PATENT DOCUMENTS

| | | |
|---|---|---|
| 8,096,651 B2 | 1/2012 | Ohshima et al. |
| 9,205,677 B2 | 12/2015 | Namba et al. |
| 9,259,935 B2 | 2/2016 | Tamai et al. |

(Continued)

FOREIGN PATENT DOCUMENTS

| | | |
|---|---|---|
| JP | 2008-019287 | 1/2008 |
| JP | 2010-155359 | 7/2010 |

(Continued)

OTHER PUBLICATIONS

U.S. Appl. No. 15/164,200, filed May 25, 2016.

*Primary Examiner* — Thao T Tran
(74) *Attorney, Agent, or Firm* — Oblon, McClelland, Maier & Neustadt, L.L.P.

(57) ABSTRACT

Provided is an ink including: a coloring material; an organic solvent; resin particles; an amine compound; and water, wherein the resin particles include urethane resin particles, and urethane-modified acrylic resin particles including a core portion containing an acrylic resin and a shell portion formed on a surface of the core portion and containing at least a urethane resin, and wherein the amine compound has a boiling point of 120 degrees C. or higher but 200 degrees C. or lower and a molecular weight of 100 or less.

12 Claims, 5 Drawing Sheets

(56) References Cited

U.S. PATENT DOCUMENTS

| | | | |
|---|---|---|---|
| 2009/0143785 A1* | 6/2009 | Chang et al. | G03G 15/104 347/45 |
| 2010/0166962 A1 | 7/2010 | Ohzeki | |
| 2011/0009561 A1* | 1/2011 | Pajerski et al. | C08J 18/12 524/591 |
| 2013/0197144 A1 | 8/2013 | Katoh et al. | |
| 2013/0307912 A1 | 11/2013 | Masuda et al. | |
| 2015/0184010 A1* | 7/2015 | Okada et al. | C09D 11/322 428/423.1 |
| 2015/0259567 A1 | 9/2015 | Tamai et al. | |
| 2015/0283828 A1 | 10/2015 | Aoai et al. | |
| 2015/0367667 A1 | 12/2015 | Aoai et al. | |
| 2016/0024323 A1 | 1/2016 | Tamai et al. | |
| 2016/0144620 A1 | 5/2016 | Masuda et al. | |
| 2016/0185110 A1 | 6/2016 | Masuda et al. | |
| 2016/0222234 A1 | 8/2016 | Matsuyama et al. | |
| 2016/0264807 A1 | 9/2016 | Sagara et al. | |

FOREIGN PATENT DOCUMENTS

| | | |
|---|---|---|
| JP | 2011-074336 | 4/2011 |
| JP | 2013-155322 | 8/2013 |

\* cited by examiner

INK, INK STORED CONTAINER, IMAGE FORMING METHOD, LIQUID DISCHARGING APPARATUS, AND IMAGE

CROSS-REFERENCE TO RELATED APPLICATIONS

The present application claims priority under 35 U.S.C. § 119 to Japanese Patent Application No. 2015-238046, filed Dec. 4, 2015. The contents of which are incorporated herein by reference in their entirety.

BACKGROUND OF THE INVENTION

Field of the Invention

The present disclosure relates to an ink, an ink stored container, an image forming method, a liquid discharging apparatus, and an image.

Description of the Related Art

Inkjet printing methods have been spreading rapidly recently, for the reasons that inkjet printing methods enable easy printing of color images and running costs of inkjet printing methods are low. As inks, water-based dye inks obtained by dissolving dyes in aqueous media and solvent inks obtained by dissolving oil-soluble dyes in organic solvents are used. From environmental and safety viewpoints, inks obtained by dissolving water-soluble dyes in water or in water and water-soluble organic solvents are used in offices and households. However, there is a problem that images formed with inks containing such water-soluble dyes are poor in water resistance and light resistance.

In this regard, water-based pigment inks obtained by dispersing particulate pigments in water are paid attention. Inks containing water-dispersible pigments are known to be excellent in water resistance and light resistance. However, when pigment inks are printed on gloss paper, the pigments, which are coloring materials, do not permeate internal portions of ink receiving layers, but remain on surfaces of the gloss paper and form coating films. This makes scratch resistance of printed surfaces poorer than when pigment inks are printed on plain paper or when dye inks that permeate internal portions of ink receiving layers are printed, leading to a problem that when printed surfaces are scratched after printing, printed coating films may peel or scratched matters may cause stains.

For the problems of scratch resistance, for example, there is proposed a method of combining a resin-coated pigment and a polyurethane resin (see, e.g., Japanese Unexamined Patent Application Publication No. 2013-155322). There is also proposed addition of a wax as a lubricant in an ink in order to provide the ink with a function of reducing a coefficient of friction of a printed image surface (see, e.g., Japanese Unexamined Patent Application Publication No. 2010-155359).

However, such inks excellent in scratch resistance have problems of discharging reliability degradation due to local drying at nozzle portions of inkjet printer heads and maintenance property degradation due to thickening and coagulation caused when water evaporates from waste inks.

Hence, there is proposed a method of adding an amine neutralizing resin in order to improve durability of an image coating film and also adding a glycol ether or an alkane diol in order to simultaneously ensure discharging reliability (see, e.g., Japanese Unexamined Patent Application Publication No. 2011-74336).

There is also proposed a method of using in combination, an organic amine salt water-soluble organic resin and a divalent alcohol-based solvent free of ether linkage in order to satisfy both of a drying property after printing and scratch resistance (see, e.g., Japanese Unexamined Patent Application Publication No. 2008-19287).

SUMMARY OF THE INVENTION

According to one aspect of the present disclosure, an ink containing a coloring material, an organic solvent, resin particles, an amine compound, and water is provided.

The resin particles contain urethane resin particles, and urethane-modified acrylic resin particles including a core portion containing an acrylic resin and a shell portion formed on a surface of the core portion and containing at least a urethane resin.

The amine compound has a boiling point of 120 degrees C. or higher but 200 degrees C. or lower and a molecular weight of 100 or less.

DESCRIPTION OF THE EMBODIMENTS (Ink)

Figure 1:
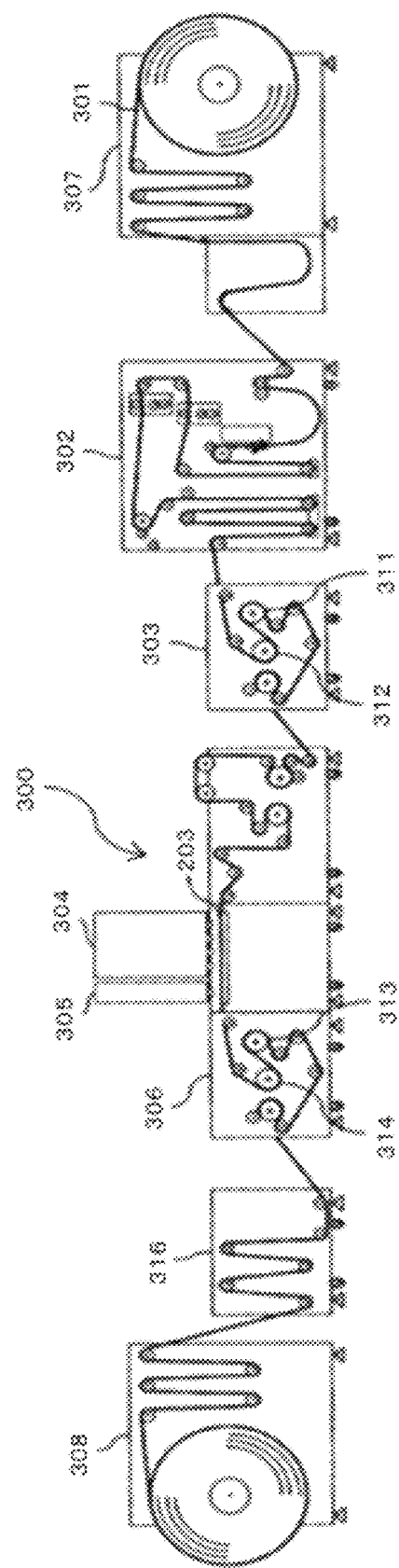
FIG. 1 is a schematic overview diagram illustrating an example of a liquid discharging apparatus according to an embodiment of the present disclosure.

An ink of the present disclosure contains a coloring material, an organic solvent, resin particles, an amine compound, and water. The resin particles contain urethane resin particles, and urethane-modified acrylic resin particles including a core portion containing an acrylic resin and a shell portion formed on a surface of the core portion and containing at least a urethane resin. The amine compound has a boiling point of 120 degrees C. or higher but 200 degrees C. or lower and a molecular weight of 100 or less. The ink preferably contains a surfactant and further contains other components as needed.

The ink of the present disclosure is based on the following finding. Images printed on existing gloss paper need to have a good scratch resistance. In order for inks to have such a good scratch resistance, there are needs that inks contain a resin and secure close adhesiveness with paper and that the resin itself be tough. However, addition of a resin in inks makes viscosity increase upon water evaporation severe, leading to discharging failures due to nozzle clogging caused by ink drying and ink adherence to about the nozzles. Furthermore, thickening and coagulation of waste inks degrade a maintenance property.

The present disclosure has an object to provide an ink that has a very good scratch resistance and can satisfy both of a good discharging stability and a maintenance property at the same time.

The present disclosure can provide an ink that has a very good scratch resistance and can satisfy both of a good discharging stability and a maintenance property at the same time.

In the present disclosure, urethane resin particles, and urethane-modified acrylic resin particles including a core portion containing an acrylic resin and a shell portion formed on a surface of the core portion and containing at least a urethane resin are used as the resin particles.

The urethane resin particles are excellent in close adhesiveness with print media and have a high wear resistance. On the other hand, the urethane-modified acrylic resin particles have an improved intimacy with the urethane resin particles by a urethane resin contained in a shell portion, and can form a firm resin film by an acrylic resin having a high hardness.

In terms of discharging stability and storage stability, it is preferable that an anionic polycarbonate urethane resin or a polyester urethane resin be used as the urethane resin.

In the present disclosure, the ink contains an amine compound having a boiling point of 120 degrees C. or higher but 200 degrees C. or lower and a molecular weight of 100 or less. This makes it possible to suppress viscosity increase upon water evaporation, and to achieve both of a high discharging stability and a maintenance property at the same time. This is because the amine compound having a small molecular weight becomes substituted in the resin particles as counter ions, and because when contained in the ink as counter ions, the amine compound having a boiling point higher than a boiling point of water can be protected by the two kinds of resin particles from being evaporated even upon water evaporation. This makes it possible for the resin particles to be maintained in a stable dispersion state and to suppress viscosity increase of the ink.

<Resin Particles>

Addition of urethane resin particles and urethane-modified acrylic resin particles as the resin particles makes it possible to satisfy both of significant improvement of scratch resistance on gloss paper and a good maintenance property at the same time.

—Urethane Resin Particles—

The polyurethane resin is a reaction product of a polyisocyanate and a polyol. One characteristic of a polyurethane resin is that a soft segment formed of a polyol component having a weak cohesive force and a hard segment formed of a urethane bond having a strong cohesive force exhibit own properties.

The soft segment is soft and resistant to deformation of print media such as stretching and folding.

The hard segment has a high close adhesiveness with print media and an excellent wear resistance. Therefore, when the hard segment is added in the ink, a high scratch resistance on gloss paper can be obtained.

Examples of a method for dispersing the urethane resin particles in an aqueous medium include a forced emulsification method using a dispersant and a self-emulsification method using the urethane resin in which an anionic group is contained.

The forced emulsification method may reduce a coating film strength because the dispersant may remain in the coating film. Therefore, use of the self-emulsification method is preferable.

Examples of the anionic group include a carboxyl group, a carboxylate group, a sulfonic acid group, and a sulfonate group. Among these anionic groups, a carboxylate group or sulfonate group partially or wholly or particularly preferably wholly neutralized with, for example, a basic compound are preferable.

Incorporation of the anionic group can be achieved with use of a polyol containing an anionic group. Examples of the polyol containing an anionic group include 2,2-dimethylolpropionic acid, 2,2-dimethylolbutanoic acid, 2,2-dimethylolheptanoic acid, and 2,2-dimethyloloctanoic acid.

Among these polyols containing an anionic group, self-emulsifying anionic polycarbonate-based or polyester-based polyurethane resin water dispersions are preferable because of an excellent dispersion stability. Polycarbonate-based polyurethane resin water dispersions are more preferable in terms of dispersion stability and storage stability of the ink.

The urethane resin particles may be an appropriately synthesized product or a commercially available product.

A volume average particle diameter of the urethane resin particles is related with a viscosity of a dispersion liquid. Among urethane resin particles having the same composition, urethane resin particles having a smaller volume average particle diameter are more able to form a coating film in a manner to fill gaps between the coloring material and a print medium and gaps between coloring material particles, resulting in a higher scratch resistance.

In terms of scratch resistance of an image printed on gloss paper, the volume average particle diameter of the urethane resin particles is preferably 10 nm or greater but 100 nm or less and more preferably 10 nm or greater but 50 nm or less.

Use of resin particles having the volume average particle diameter of 10 nm or greater makes it possible to prevent thickening of the ink and to improve storage stability. Use of resin particles having the volume average particle diameter of 100 nm or less is preferable, because a high scratch resistance that suppresses an image from being stretched can be obtained.

It is preferable that the urethane resin particles function to fix the coloring material on a surface of a print medium and become a coating film at normal temperature to improve fixability of the coloring material. For this reason, a minimum filming temperature (MFT) of the urethane resin particles is preferably 30 degrees C. or lower. When a glass transition temperature of the urethane resin particles is minus 40 degrees C. or lower, a resin coating film is increased in viscous property, and tackiness appears on the printed matter. Therefore, the glass transition temperature of the urethane resin particles is preferably minus 30 degrees C. or higher.

A content of the urethane resin particles is preferably 1 percent by mass or greater but 10 percent by mass or less and more preferably 1.5 percent by mass or greater but 5 percent by mass or less of the total amount of the ink. When the content of the urethane resin particles is 1 percent by mass or greater, a better scratch resistance can be obtained. When the content of the urethane resin particles is 10 percent by mass or less, viscosity increase upon water evaporation is suppressed, and a good maintenance property can be maintained.

—Urethane-Modified Acrylic Resin Particles—

The urethane-modified acrylic resin particles include a core portion containing an acrylic resin and a shell portion formed on a surface of the core portion and containing at least a urethane resin.

With a urethane resin in the shell portion, the urethane-modified acrylic resin particles have a good intimacy with the urethane resin particles. In addition, owing to the amine compound, the urethane-modified acrylic resin particles have an improved dispersibility like the urethane resin particles. Therefore, a uniform film can be obtained even when the urethane-modified acrylic resin particles are mixed with the urethane resin particles. Furthermore, an ink film becomes stronger and can obtain a higher scratch resistance on gloss paper when a hard resin such as an acrylic resin is mixed than when urethane resin particles alone are contained.

The core-shell-type urethane-modified acrylic resin particles are not particularly limited and may be appropriately selected depending on the intended purpose. Examples of the core-shell-type urethane-modified acrylic resin particles include core-shell-type urethane-modified acrylic resin particles produced by seed polymerization, multi-stage polymerization, and a power feed method.

A method described below is preferable as a method for producing the urethane-modified acrylic resin particles.

(a) At least one kind of organic diisocyanate (A) and at least one kind of polycarbonate polyol (B) are allowed to undergo a reaction. Subsequently, an acid diol is added to the resultant, to form a poly(carbonate-urethane) prepolymer (A1) in which a carboxyl group is incorporated.

(b) An acrylic-based monomer (C) is added to the prepolymer (A1), to obtain a prepolymer/monomer mixture.

(c) A tertiary amine is added to the mixture to disperse the mixture in water. Subsequently, a radical initiator and a chain extender are added to the resultant.

(d) The aqueous dispersion liquid is heated to polymerize the acrylic-based monomer. In this way, a resin emulsion including resin particles containing (A1) described above as a shell component and a copolymer of (C) described above as a core can be obtained.

The organic diisocyanate (A) may be any of an aliphatic diisocyanate, an alicyclic diisocyanate, an aliphatic aromatic diisocyanate, and an aromatic diisocyanate.

Examples of the organic diisocyanate include ethylene diisocyanate, 1,6-hexamethylene diisocyanate, isophorone diisocyanate, cyclohexane-1,4-diisocyanate, 4,4'-dicyclohexylmethane diisocyanate, 1,4-phenylene diisocyanate, 2,4-toluene diisocyanate, 2,6-toluene diisocyanate, 4,4'-diphenylmethane diisocyanate, 2,4'-diphenylmethane diisocyanate, polymethylene polyphenyl polyisocyanate, and 1,5-naphthylene diisocyanate. One of these organic diisocyanates may be used alone or two or more of these organic diisocyanates may be used in combination.

The polycarbonate polyol (B) is preferably a product obtained by allowing a diol and a carbonate compound to undergo a reaction.

Examples of the diol include 1,3-propanediol, 2-methyl-1,3-propanediol, 1,4-butanediol, 1,6-propanediol, and diethylene glycol.

Examples of the carbonate compound include ethylene carbonate, diphenyl carbonate, and phosgene.

It is preferable to use an acrylic acid ester or a methacrylic acid ester as the acrylic-based monomer (C). More specifically, the acrylic-based monomer (C) is preferably a lower ($C_1$ through $C_6$) alkyl ester of acrylic acid or methacrylic acid, to which a vinyl-based monomer may be added as needed. Examples of the vinyl-based monomer include butadiene, styrene, substituted styrene, vinyl acetate, vinyl butyrate, vinyl chloride, and vinylidene chloride.

The other additives are not particularly limited and may be appropriately selected depending on the intended purpose. Examples of the other additives include an acid diol, a tertiary amine, a radical initiator, and a chain extender.

Examples of the acid diol include 2,2-dimethylol propionic acid.

Examples of the tertiary amine include triethylamine and dimethylethanolamine.

Examples of the radical initiator include 2,2'-azobis(2,4-dimethylpentanenitrile) and 2,2'-azobis(2-methylpropanenitrile).

Examples of the chain extender include ethylenediamine, diethylenetriamine, and triethylenetetramine.

The core-shell-type urethane-modified acrylic resin particles may be a commercially available product. Examples of the commercially available product in the form of a resin emulsion dispersed in water include ACRIT WEM series (e.g., WEM-200U and WEM-3000) available from Taisei Fine Chemical Co., Ltd.

When the content of the urethane resin particles in the ink is assumed to be 1 part by mass, a content of the urethane-modified acrylic resin particles in the ink is preferably 0.2 parts by mass or greater but 0.8 parts by mass or less. When the content of the urethane-modified acrylic resin particles is 0.2 parts by mass or greater but 0.8 parts by mass or less, a good film strength and a good close adhesiveness with a print medium can be obtained.

The resin particles contained in the ink of the present disclosure may also contain any other resin particles in addition to the urethane resin particles and the urethane-modified acrylic resin particles. Examples of the any other resin particles include acrylic resin particles, styrene-acrylic resin particles, acrylic-silicone resin particles, and fluororesin particles.

When a content of the coloring material in the ink is assumed to be 1 part by mass, a content of the resin particles in the ink is preferably 0.05 parts by mass or greater but 2 parts by mass or less. When the content of the resin particles is 0.05 parts by mass or greater, fixability can be ensured. When the content of the resin particles is 2 parts by mass or less, a good discharging stability can be ensured.

<Amine Compound>

The amine compound has a boiling point of 120 degrees C. or higher but 200 degrees C. or lower and a molecular weight of 100 or less.

The amine compound may be any of primary, secondary, tertiary, and quaternary amines and salts of these amines. The quaternary amines refer to compounds in which 4 alkyl groups are substituted in a nitrogen atom.

A compound represented by general formula (I) below, a compound represented by general formula (II) below, and a heterocyclic amine are preferable as the amine compound.

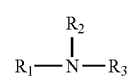

General formula (I)

In general formula (I), $R_1$, $R_2$, and $R_3$ each represent any of a hydrogen atom, an alkoxy group containing from 1 through 4 carbon atoms, an alkyl group containing from 1 through 3 carbon atoms, and a hydroxyethyl group. A case in which all of $R_1$, $R_2$, and $R_3$ are hydrogen atoms is excluded.

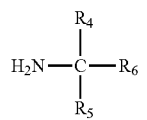

General formula (II)

In general formula (II), $R_4$, $R_5$, and $R_6$ each represent any of a hydrogen atom, a methyl group, an ethyl group, a hydroxymethyl group, and an alkyl group containing from 1 through 4 carbon atoms.

Examples of the compounds represented by general formulae (I) and (II) include 1-amino-2-propanol, 3-amino-1-propanol, N-methylethanolamine, N,N-dimethylethanolamine, and 1-amino-2-methyl-propanol.

Examples of the heterocyclic amine include piperazine.

One of these amine compounds may be used alone or two or more of these amine compounds may be used in combination.

Any other amine compound may also be used in addition to the amine compounds presented above.

When the content of the resin particles in the ink is assumed to be 1 part by mass, a content of the amine compound in the ink is preferably 0.05 parts by mass or greater but 1 part by mass or less. When the content of the amine compound is 0.05 parts by mass or greater but 1 part by mass or less, the amine compound can ensure storage stability by exhibiting the effect of suppressing viscosity increase of the ink upon water evaporation. Furthermore, stable dispersibility of the two kinds of resin particles is maintained. This makes it possible to obtain a uniform ink film even when the two kinds of resin particles are mixed, and to obtain an extremely strong film having a high close adhesiveness with a base material. Hence, an extremely high scratch resistance, discharging stability, and a maintenance property can be satisfied at the same time.

In terms of pH regulation of the ink, the content of the amine compound is preferably 0.01 percent by mass or greater but 5 percent by mass or less and more preferably 0.05 percent by mass or greater but 2 percent by mass or less of the total amount of the ink.

<Organic Solvent>

It is preferable that the organic solvent contain a polyol having a solubility parameter (SP value) in a range of from 11.8 through 14.0.

Examples of the polyol having a solubility parameter (SP value) in a range of from 11.8 through 14.0 include 3-methyl-1,3-butanediol (SP value: 12.05), 1,2-butanediol (SP value: 12.75), 1,3-butanediol (SP value: 12.75), 1,4-butanediol (SP value: 12.95), 2,3-butanediol (SP value: 12.55), 1,2-propanediol (SP value: 13.48), 1,3-propanediol (SP value: 13.72), 1,2-hexanediol (SP value: 11.80), 1,6-hexanediol (SP value: 11.95), 3-methyl-1,5-pentanediol (SP value: 11.80), triethylene glycol (SP value: 12.12), and diethylene glycol (SP value: 13.02). One of these polyols may be used alone or two or more of these polyols may be used in combination.

Among these polyols, 3-methyl-1,3-butanediol (SP value: 12.05), 1,2-butanediol (SP value: 12.75), 1,3-butanediol (SP value: 12.75), 1,4-butanediol (SP value: 12.95), 2,3-butanediol (SP value: 12.55), 1,2-propanediol (SP value: 13.48), and 1,3-propanediol (SP value: 13.72) are preferable, and 3-methyl-1,3-butanediol (SP value: 12.05) and 1,3-butanediol (SP value: 12.75) are more preferable.

Any other organic solvent may be used in combination with the polyol. A ratio (ratio by mass) between the polyol and any other organic solvent cannot be determined flatly because the ratio more or less depends on the kinds and amounts of other additives, but is preferably in a range of from 10/90 through 90/10 and more preferably in a range of from 40/60 through 60/40. Examples of the any other organic solvent include polyols, polyol alkyl ethers, polyol aryl ethers, nitrogen-containing heterocyclic compounds, amides, amines, sulfur-containing compounds, propylene carbonate, ethylene carbonate, and other humectants. It is preferable that the organic solvent contain a permeating agent. One of these organic solvents may be used alone or two or more of these organic solvents may be used in combination.

Examples of the polyols include glycerin (SP value: 16.38), dipropylene glycol (bp: 232 degrees C.), 1,5-pentanetriol (bp: 242 degrees C.), 3-methyl-1,3-butanediol (bp: 203 degrees C.), propylene glycol (bp: 187 degrees C.), 2-methyl-2,4-pentanediol (bp: 197 degrees C.), ethylene glycol (bp: from 196 degrees C. through 198 degrees C.), tripropylene glycol (bp: 267 degrees C.), hexylene glycol (bp: 197 degrees C.), polyethylene glycol (from a viscous liquid to a solid), polypropylene glycol (bp: 187 degrees C.), 1,6-hexanediol (bp: from 253 degrees C. through 260 degrees C.), 1,2,6-hexanetriol (bp: 178 degrees C.), trimethylolethane (solid, mp: from 199 degrees C. through 201 degrees C.), and trimethylolpropane (solid, mp: 61 degrees C.).

Examples of the polyol alkyl ethers include ethylene glycol monoethyl ether (bp: 135 degrees C.), ethylene glycol monobutyl ether (bp: 171 degrees C.), diethylene glycol monomethyl ether (bp: 194 degrees C.), diethylene glycol monobutyl ether (bp: 231 degrees C.), ethylene glycol mono-2-ethylhexyl ether (bp: 229 degrees C.), and propylene glycol monoethyl ether (bp: 132 degrees C.).

Examples of the polyol aryl ethers include ethylene glycol monophenyl ether (bp: 237 degrees C.) and ethylene glycol monobenzyl ether.

Examples of the nitrogen-containing heterocyclic compounds include N-methyl-2-pyrrolidone (bp: 202 degrees C.), 1,3-dimethyl-2-imidazolidinone (bp: 226 degrees C.), ε-caprolactam (bp: 270 degrees C.), and γ-butyrolactone (bp: from 204 degrees C. through 205 degrees C.).

Examples of the amides include formamide (bp: 210 degrees C.), N-methylformamide (bp: from 199 degrees C. through 201 degrees C.), N,N-dimethylformamide (bp: 153 degrees C.), and N,N-diethylformamide (bp: from 176 degrees C. through 177 degrees C.).

Examples of the amines include monoethanolamine (bp: 170 degrees C.), diethanolamine (bp: 268 degrees C.), triethanolamine (bp: 360 degrees C.), N,N-dimethylmonoethanolamine (bp: 139 degrees C.), N-methyldiethanolamine (bp: 243 degrees C.), N-methylethanolamine (bp: 159 degrees C.), N-phenylethanolamine (bp: from 282 degrees C. through 287 degrees C.), and 3-aminopropyldiethylamine (bp: 169 degrees C.).

Examples of the sulfur-containing compounds include dimethylsulfoxide (bp: 139 degrees C.), sulfolane (bp: 285 degrees C.), and thiodiglycol (bp: 282 degrees C.).

A total content of the polyol having a solubility parameter (SP value) in a range of from 11.8 through 14.0 and the any other organic solvent in the ink is preferably 30 percent by mass or greater but 50 percent by mass or less of the total amount of the ink.

When the total content is 30 percent by mass or greater, an ink viscosity after water evaporation is adequate. When the total content is 50 percent by mass or less, a drying property is adequate.

It is preferable that the permeating agent contain at least one kind of a non-humectant polyol compound containing from 8 through 11 carbon atoms or at least one kind of a glycol ether compound.

Non-humectant means that a substance has a solubility of 0.2 percent by mass or greater but 5.0 percent by mass or less in water of 25 degrees C. Among non-humectant polyol compounds, a 1,3-diol compound represented by general formula (III) below is preferable, and 2-ethyl-1,3-hexanediol [solubility: 4.2 percent (25 degrees C.)] and 2,2,4-trimethyl-1,3-pentanediol [solubility: 2.0 percent (25 degrees C.)] are particularly preferable.

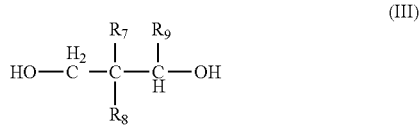

(III)

In general formula (III), $R_7$ represents a methyl group or an ethyl group, $R_8$ represents a hydrogen atom or a methyl group, and $R_9$ represents an ethyl group or a propyl group.

Examples of other non-humectant polyol compounds among aliphatic diols include 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, and 5-hexene-1,2-diol.

A content of the permeating agent is preferably 0.5 percent by mass or greater but 5 percent by mass or less and more preferably 1 percent by mass or greater but 3 percent by mass or less of the total amount of the ink. When the content of the permeating agent is 0.5 percent by mass or greater, an excellent permeation effect can be obtained and image qualities are good. When the content of the permeating agent is 5 percent by mass or less, the permeating agent has an excellent solubility and an initial viscosity of the ink is adequate.

<Coloring Material>

A pigment is mainly used as the coloring material from a viewpoint of weather resistance. However, for adjustment of color tone, the coloring material may contain a dye within a range in which weather resistance is not degraded.

The pigment is not particularly limited and may be appropriately selected depending on the intended purpose. Examples of the pigment include inorganic pigments and organic pigments for black or colors.

It is preferable to use carbon black or a color pigment as the pigment.

It is preferable that the carbon black be produced by a furnace method or a channel method and have a primary particle diameter of 15 nm or greater but 40 nm or less, a BET specific surface area of 50 $m^2$/g or greater but 300 $m^2$/g or less, a DBP oil absorption of from 40 ml/100 g through 150 ml/100 g, a volatile content of 0.5 percent or greater but 10 percent or less, and a pH value of 2 or higher but 9 or lower.

Such carbon black is not particularly limited and may be appropriately selected depending on the intended purpose. Examples of such carbon black include: No. 2300, No. 900, MCF-88, No. 33, No. 40, No. 45, No. 52, MA7, MA8, MA100, and No. 2200B (all available from Mitsubishi Chemical Corporation); RAVEN 700, 5750, 5250, 5000, 3500, and 1255 (all available from Columbia Carbon Company); REGAL 400R, 330R, 660R, MOGUL L, MONARCH 700, 800, 880, 900, 1000, 1100, 1300, and MONARCH 1400 (all available from Cabot Corporation); and COLOR BLACK FW1, FW2, FW2V, FW18, FW200, S150, S160, S170, PRINTEX 35, U, V, 140U, 140V, SPECIAL BLACK 6, 5, 4A, and 4 (all available from Degussa AG).

Examples of the color pigment include anthraquinone, phthalocyanine blue, phthalocyanine green, diazo, monoazo, pyranthrone, perylene, heterocyclic yellow, quinacridone, and (thio)indigoid.

Examples of the phthalocyanine blue include copper phthalocyanine blue and derivatives (pigment blue 15) of copper phthalocyanine blue.

Examples of the quinacridone include pigment orange 48, pigment orange 49, pigment red 122, pigment red 192, pigment red 202, pigment red 206, pigment red 207, pigment red 209, pigment violet 19, and pigment violet 42.

Examples of the anthraquinone include pigment red 43, pigment red 194 (perinone red), pigment red 216 (brominated pyranthrone red), and pigment red 226 (pyranthrone red).

Example of the perylene include pigment red 123 (vermilion), pigment red 149 (scarlet), pigment red 179 (maroon), pigment red 190 (red), pigment violet, pigment red 189 (yellow shade red), and pigment red 224.

Examples of the (thio)indigoid include pigment red 86, pigment red 87, pigment red 88, pigment red 181, pigment red 198, pigment violet 36, and pigment violet 38.

Examples of the heterocyclic yellow include pigment yellow 117 and pigment yellow 138.

Other appropriate coloring pigments are described in *The Colour Index*, third edition (The Society of Dyers and Colourists, 1982).

A volume average particle diameter of the pigment is not particularly limited, may be appropriately selected depending on the intended purpose, and is preferably 10 nm or greater but 150 nm or less, more preferably 20 nm or greater but 100 nm or less, and yet more preferably 30 nm or greater but 80 nm or less.

The volume average particle diameter of the pigment refers to a volume-based average particle diameter measured using, for example MICROTRAC UPA-150 available from Nikkiso Co., Ltd. and a measurement sample diluted with pure water to have a pigment concentration (mass concentration) of 0.01 percent by mass, at a particle refractive index of 1.51, at a particle density of 1.4 g/$cm^3$, using a parameter of pure water as a solvent parameter, at 23 degrees C.

As the dye, a dye excellent in water resistance and light resistance is used.

Examples of acid dyes and food dyes include: C.I. acid yellow 17, 23, 42, 44, 79, and 142; C.I. acid red 1, 8, 13, 14, 18, 26, 27, 35, 37, 42, 52, 82, 87, 89, 92, 97, 106, 111, 114, 115, 134, 186, 249, 254, and 289; C.I. acid blue 9, 29, 45, 92, and 249; C.I. acid black 1, 2, 7, 24, 26, and 94; C.I. food yellow 3 and 4; C.I. food red 7, 9, and 14; and C.I. food black 1 and 2.

Examples of direct dyes include: C.I. direct yellow 1, 12, 24, 26, 33, 44, 50, 86, 120, 132, 142, and 144; C.I. direct red 1, 4, 9, 13, 17, 20, 28, 31, 39, 80, 81, 83, 89, 225, and 227; C.I. direct orange 26, 29, 62, and 102; C.I. direct blue 1, 2, 6, 15, 22, 25, 71, 76, 79, 86, 87, 90, 98, 163, 165, 199, and 202; and C.I. direct black 19, 22, 32, 38, 51, 56, 71, 74, 75, 77, 154, 168, and 171.

Examples of basic dyes include: C.I. basic yellow 1, 2, 11, 13, 14, 15, 19, 21, 23, 24, 25, 28, 29, 32, 36, 40, 41, 45, 49, 51, 53, 63, 64, 65, 67, 70, 73, 77, 87, and 91; C.I. basic red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, and 112; C.I. basic blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, and 155; and C.I. basic black 2 and 8.

Examples of reactive dyes include: C.I. reactive black 3, 4, 7, 11, 12, and 17; C.I. reactive yellow 1, 5, 11, 13, 14, 20, 21, 22, 25, 40, 47, 51, 55, 65, and 67; C.I. reactive red 1, 14, 17, 25, 26, 32, 37, 44, 46, 55, 60, 66, 74, 79, 96, and 97; and C.I. reactive blue 1, 2, 7, 14, 15, 23, 32, 35, 38, 41, 63, 80, and 95.

The following first and second forms can be raised as preferable forms of the coloring material.

(1) The first form contains a water dispersion of polymer particles containing a water-insoluble or sparingly-water-soluble pigment (a resin-coated coloring material).

(2) The second form contains a coloring material containing at least one kind of hydrophilic group on a surface and exhibiting water dispersibility in the absence of a dispersant (a self-dispersible coloring material).

When the self-dispersible coloring material is used, a high flowability can be obtained after water is evaporated. When the resin-coated coloring material is used, a high fixability on gloss paper can be obtained.

—Resin-Coated Coloring Material of the First Form—

As the resin-coated coloring material of the first form, the coloring material, and a polymer emulsion obtained by making polymer particles contain a coloring material are preferable.

The polymer emulsion obtained by making polymer particles contain a coloring material refers to a product obtained by encapsulating a coloring material in polymer particles or a product obtained by adsorbing a coloring material to surfaces of polymer particles.

The resin-coated coloring material is a product obtained by coating a coloring material with a resin having a hydrophilic group for microcapsulation of the coloring material to make the coloring material stably dispersible without a dispersant.

Examples of the resin to coat the coloring material include polyamides, polyurethanes, polyesters, polyureas, epoxy resins, polycarbonates, urea resins, melamine resins, phenol resins, polysaccharides, gelatin, gum arabic, dextran, casein, proteins, natural rubbers, carboxypolymethylene, polyvinyl alcohols, polyvinyl pyrrolidones, polyvinyl acetates, polyvinyl chlorides, polyvinylidene chlorides, cellulose, ethylcellulose, methylcellulose, nitrocellulose, hydroxycellulose, cellulose acetate, polyethylenes, polystyrenes, polymers or copolymers of (meth)acrylic acid, polymers or copolymers of (meth)acrylic acid esters, (meth)acrylic acid-(meth)acrylic acid ester copolymers, styrene-(meth)acrylic acid copolymers, styrene-maleic acid copolymers, sodium alginate, fatty acids, paraffins, beeswax, privet wax, hydrogenated beef tallow, carnauba wax, and albumin. One of these resins may be used alone or two or more of these resins may be used in combination.

Among these resins, organic polymer materials containing an anionic group such as a carboxylic acid group or a sulfonic acid group are preferable.

Examples of nonionic organic polymer materials include polyvinyl alcohols, polyethylene glycol monomethacrylate, polypropylene glycol monomethacrylate, and methoxypolyethylene glycol monomethacrylate, or (co)polymers of these nonionic organic polymer materials, and a cationic ring-opening polymerization product of 2-oxazoline. Among these nonionic organic polymer materials, completely saponified products of polyvinyl alcohols are particularly preferable because of the characteristic of being poor in water solubility, and easily soluble in hot water but sparingly soluble in cold water.

A content of the organic polymer material to constitute wall film materials of the microcapsule of the resin-coated coloring material is preferably 15 percent by mass or greater but 40 percent by mass or less. When the content of the organic polymer material is in the range described above, the content of the organic polymer material in the capsule is relatively low. This makes it possible to suppress chromogenicity of the pigment from being poor due to coating of the surface of the pigment by the organic polymer material.

When the content of the organic polymer material is 15 percent by mass or greater, the effect of the encapsulation can be obtained well. When the content of the organic polymer material is 40 percent by mass or less, chromogenicity of the pigment is good.

A method for coating the pigment with an organic polymer material for microcapsulation is not particularly limited, and all hitherto known methods may be used. Examples of known methods include chemical producing methods, physical producing methods, physicochemical methods, and mechanical producing methods.

Examples of the method for microcapsulation include an interfacial polymerization method, an in-situ polymerization method, an in-liquid curing coating method, a coacervation (phase separation) method, an in-liquid drying method, a fusion distribution cooling method, an aerial suspension coating method, a spray drying method, an acid deposition method, and a phase-transfer emulsification method.

The interfacial polymerization method is a method of dissolving two kinds of monomers or two kinds of reactants in a dispersed phase and a continuous phase separately and allowing both of the substances to undergo a reaction at the interface between the substances to form a wall film.

The in-situ polymerization method is a method of supplying a liquid or gaseous monomer and a catalyst or two kinds of reactive substances either from a continuous phase or from nuclear particles to cause a reaction to form a wall film.

The in-liquid curing coating method is a method of insolubilizing droplets of a polymer solution containing core substance particles in a liquid using, for example, a curing agent to form a wall film.

The coacervation (phase separation) method is a method of separating a polymer dispersion liquid in which core substance particles are dispersed into a coacervate (dense phase) having a high polymer concentration and a dilute phase to form a wall film.

The in-liquid drying method is a method of preparing a dispersion liquid in which a core substance is dispersed in a solution of a wall film substance, pouring the dispersion liquid into a liquid with which a continuous phase of the dispersion liquid is immiscible to make a composite emulsion, and gradually removing the solvent in which the wall film substance is dissolved to form a wall film.

The fusion distribution cooling method is a method using a wall film substance that melts into a liquid state when heated and solidifies at normal temperature, to heat and liquefy the wall film substance, disperse core substance particles in the liquefied wall film substance, make the resultant into minute particles, and cool the minute particles to form a wall film.

The aerial suspension coating method is a method of suspending powder-state core substance particles in air with a fluidized bed, and while floating the core substance particles in an air stream, spraying and mixing a coating liquid of a wall film substance to form a wall film.

The spray drying method is a method of spraying an undiluted encapsulating liquid to expose the liquid to hot air, evaporate and dry a volatile content, and form a wall film.

The acid deposition method is a method of neutralizing at least a part of anionic groups of an anionic group-containing organic polymer compound with a basic compound to impart water solubility to the organic polymer compound, kneading the organic polymer compound together with a coloring material in an aqueous medium, adjusting the resultant to a neutral level or an acidic level with an acidic compound to deposit the organic compound and make the organic compound adhere to the coloring material, and neutralizing and dispersing the resultant.

The phase-transfer emulsification method is a method of preparing a mixture of an anionic organic polymer having water dispersibility and a coloring material as an organic solvent phase and feeding water to the organic solvent phase or feeding the organic solvent phase to water.

It is preferable to select a suitable organic polymer depending on the microcapsulation methods. For example, polyesters, polyamides, polyurethanes, polyvinyl pyrrolidones, and epoxy resins are suitable for the interfacial polymerization method.

For example, polymers or copolymers of (meth)acrylic acid esters, (meth)acrylic acid-(meth)acrylic acid ester copolymers, styrene-(meth)acrylic acid copolymers, polyvinyl chlorides, polyvinylidene chlorides, and polyamides are suitable for the in-situ polymerization method.

For example, sodium alginate, polyvinyl alcohols, gelatin, albumin, and epoxy resins are suitable for the in-liquid curing method.

For example, gelatin, celluloses, and casein are suitable for the coacervation method.

Needless to say, all hitherto known encapsulation methods other than the methods described above can be used in order to obtain a minute, uniform microcapsulated pigment.

When the phase-transfer method or the acid deposition method is selected as the microcapsulation method, the organic polymer used to constitute a wall film substance of the microcapsule is preferably an anionic organic polymer.

The phase-transfer method is a method of preparing a composite product or a composite body of an anionic organic polymer having self-dispersibility or solubility in water and carbon black or a mixture of carbon black, a curing agent, and an anionic organic polymer as an organic solvent phase, feeding water to the organic solvent phase or feeding the organic solvent phase to water, and making the materials form a microcapsule while making the materials undergo self-dispersion (phase-transfer emulsification).

The carbon black encompasses self-dispersible carbon black. In the phase-transfer method, no troubles occur during the production even if a vehicle for a printing liquid or an additive is mixed in the organic solvent phase. Particularly, it is rather preferable to mix the liquid medium of the ink, because this makes it possible to produce a dispersion liquid of the printing liquid directly.

The acid deposition method is a method of microcapsulating a water-containing cake through neutralization of a part or a whole of anionic groups of the water-containing cake with a basic compound, where the water-containing cake is obtained by a producing method including a step of neutralizing a part or a whole of anionic groups of an anionic group-containing organic polymer with a basic compound and kneading the anionic group-containing organic polymer together with a coloring material such as carbon black in an aqueous medium and a step of adjusting pH of the resultant to a neutral level or an acidic level with an acidic compound to deposit the anionic group-containing organic polymer and make the anionic group-containing organic polymer adhere to the pigment. Through this process, an aqueous dispersion liquid containing a minute, pigment-rich anionic microcapsulated pigment can be produced.

A solvent used for the microcapsulation is not particularly limited and may be appropriately selected depending on the intended purpose. Examples of the solvent include: alkyl alcohols such as methanol, ethanol, propanol, and butanol; aromatic hydrocarbons such as benzol, toluol, and xylol; esters such as methyl acetate, ethyl acetate, and butyl acetate; chlorinated hydrocarbons such as chloroform and ethylene dichloride; ketones such as acetone and methyl isobutyl ketone; ethers such as tetrahydrofuran and dioxane and cellosolves such as methylcellosolve and butylcellosolve.

The intended ink can be obtained by once separating the microcapsule prepared by the methods described above from the solvent presented above by, for example, centrifugation or filtration and stirring the separated microcapsule with water and a solvent as needed for re-dispersion. A volume average particle diameter of the capsulated pigment obtained by the methods described above is preferably 50 nm or greater but 180 nm or less.

—Self-Dispersible Coloring Material of the Second Form—

The self-dispersible coloring material of the second form is a product obtained by binding at least one kind of a functional group directly or via a group of atoms with a surface of a pigment, which is a coloring material, to make the pigment stably dispersible without a dispersant. It is preferable that the pigment having a functional group incorporated into the surface have ionicity and be anionically charged or cationically charged.

Examples of the anionic functional group include —COOM, —$SO_3$M, —PO:HM, —$PO_3M_2$, —$CONM_2$, —SO:$NM_2$, —NH—$C_6H_4$—COOM, —NH—$C_6H_4$—$SO_3$M, —NH—$C_6H_4$—$PO_3$HM, —NH—$C_6H_4$—$PO_3M_2$, —NH—$C_6H_4$—$CONM_2$, and —NH—$C_6H_4$—$SO_3NM_2$. Examples of the counter ion M include an alkali metal ion and a quaternary ammonium ion. Of these counter ions, a quaternary ammonium ion is preferable.

Examples of the quaternary ammonium ion include a tetramethylammonium ion, a tetraethylammonium ion, a tetrapropylammonium ion, a tetrabutylammonium ion, a tetrapentylammonium ion, a benzyltrimethylammonium ion, a benzyltriethylammonium ion, and a tetrahexylammonium ion. Among these quaternary ammonium ions, a tetrabutylammonium ion is preferable.

It is estimated that a self-dispersible pigment containing the hydrophilic functional group and the quaternary ammonium ion exhibits affinity in both of a water-rich ink and an organic solvent-rich ink from which water has evaporated, and can be stably maintained in a dispersed state.

A content of the coloring material is preferably 1 percent by mass or greater but 15 percent by mass or less and more preferably 2 percent by mass or greater but 10 percent by mass or less of the total amount of the ink. When the content of the coloring material is 1 percent by mass or greater, ink chromogenicity and image density are good. When the content of the coloring material is 15 percent by mass or less, ink dischargeability is good, and cost efficiency is also good.

The coloring material may be not only the resin-coated coloring material and the self-dispersible coloring material, but also a pigment dispersed in an aqueous medium with a dispersant. When these three types (i.e., a resin-coated coloring material, a pigment dispersed in an aqueous medium with a dispersant, and a self-dispersible coloring material) are used in combination, a total content of the pigment contained in the resin-coated coloring material, the pigment in the coloring material dispersed with a dispersant, and the self-dispersible coloring material is preferably 3.0 percent by mass or greater but 10.0 percent by mass or less. When the total content of the coloring materials is 3.0 percent by mass or greater, image density is good. When the total content of the coloring materials is 10 percent by mass or less, discharging stability is good.

The dispersant is not particularly limited and may be appropriately selected depending on the intended purpose. Examples of the dispersant include polymeric dispersants and surfactants. Among these dispersants, dispersants mainly formed of an alkali metal salt, an organic base salt, or both of an alkali metal salt and an organic base salt of a naphthalene sulfonate-formalin condensate are preferable.

The polymeric dispersant may be a water-soluble resin. Examples of the water-soluble resin include block copolymers or random copolymers formed of at least two or more monomers selected from the group consisting of styrene, styrene derivatives, vinyl naphthalene derivatives, aliphatic alcohol esters of α,β-ethyleny unsaturated carboxylic acid, acrylic acid, acrylic acid derivatives, maleic acid, maleic acid derivatives, itaconic acid, itaconic acid derivatives, fumaric acid, and fumaric acid derivatives, or salts of these block copolymers or random copolymers. These water-soluble resins are alkali-soluble resins soluble in an aqueous solution in which a base is dissolved. Among such alkali-soluble resins, alkali-soluble resins having a weight average molecular weight of from 3,000 through 20,000 are particularly preferable, because when used in inks, such alkali-soluble resins can impart a low viscosity to the dispersion liquids and are easily dispersible.

The surfactant may be appropriately selected depending on the kind of the pigment and the ink prescription. Surfactants are classified into, for example, nonionic surfactants, anionic surfactants, and amphoteric surfactants.

Examples of the nonionic surfactants include polyoxyethylene alky ethers such as polyoxyethylene lauryl ether, polyoxyethylene myristyl ether, polyoxyethylene cetyl ether, polyoxyethylene stearyl ether, and polyoxyethylene oleyl ether, polyoxyethylene alkylphenyl ethers such as polyoxyethylene octylphenyl ether and polyoxyethylene nonylphenyl ether, polyoxyethylene-α-naphthyl ether, polyoxyethylene-β-naphthyl ether, polyoxyethylene monostyrylphenyl ether, polyoxyethylene distyrylphenyl ether, polyoxyethylene alkylnaphthyl ether, polyoxyethylene monostyrylnaphthyl ether, and polyoxyethylene distyrylnaphthyl ether. Examples of other usable surfactants include: surfactants such as polyoxyethylene-polyoxypropylene block copolymers obtained by substituting polyoxypropylene for part of polyoxyethylene of these surfactants; and surfactants obtained by condensation of aromatic ring-containing compounds such as polyoxyethylene alkylphenyl ether with, for example, formalin.

Examples of the anionic surfactants include polyoxyethylene alkyl ether sulfates, polyoxyethylene alkylphenyl ether sulfates, polyoxyethylene monostyrylphenyl ether sulfates, polyoxyethylene distyrylphenyl ether sulfates, polyoxyethylene alkyl ether phosphates, polyoxyethylene alkylphenyl ether phosphates, polyoxyethylene monostyrylphenyl ether phosphates, polyoxyethylene distyrylphenyl ether phosphates, polyoxyethylene alkyl ether carboxylates, polyoxyethylene alkylphenyl ether carboxylates, polyoxyethylene monostyrylphenyl ether carboxylates, polyoxyethylene distyrylphenyl ether carboxylates, naphthalene sulfonate-formalin condensates, melanin sulfonate-formalin condensates, dialkylsulfosuccinic acid ester salts, sulfosuccinic acid alkyl desalts, polyoxyethylene alkylsulfosuccinic acid desalts, alkylsulfoacetates, α-olefin sulfonates, alkylbenzene sulfonates, alkylnaphthalene sulfonates, alkyl sulfonates, N-acyl amino acid salts, acylated peptides, and soaps.

<Water>

Examples of the water include pure water such as ion-changed water, ultrafiltrated water, reverse osmotic water, and distilled water, and ultrapure water. A content of the water in the ink is not particularly limited and may be appropriately selected depending on the intended purpose. However, the content of the water is preferably 10 percent by mass or greater but 90 percent by mass or less and more preferably 20 percent by mass or greater but 60 percent by mass or less in terms of a drying property and discharging reliability of the ink.

<Surfactant>

The surfactant, when added in the ink, reduces surface tension of the ink and makes permeation of ink droplets into a print medium such as paper speedy after the ink droplets land on the print medium. Therefore, the surfactant can reduce feathering and color bleeding.

Depending on the polarity of a hydrophilic group, the surfactant is classified into nonionic surfactants, anionic surfactants, and amphoteric surfactants. Furthermore, depending on the structure of a hydrophobic group, the surfactant is classified into fluorosurfactants, silicone-based surfactants, and acetylene-based surfactants.

Among these surfactants, fluorosurfactants, silicone-based surfactants, and acetylene-based surfactants, or combined use of these surfactants are preferable. Combined use of a fluorosurfactant and an acetylene glycol-based surfactant is more preferable.

Addition of the surfactant worsens a bubble defoaming property. However, combined use of these surfactants can reduce surface tension with only relatively little foaming impact.

Examples of the fluorosurfactants include perfluoroalkyl sulfonates, perfluoroalkyl carboxylates, perfluoroalkyl phosphoric acid esters, perfluoroalkyl ethylene oxide adducts, perfluoroalkyl betaine, and perfluoroalkylamine oxide compounds.

The fluorosurfactant may be a commercially available product. Examples of the commercially available product include: SURFLON S-111, S-112, S-113, S121, S131, S132, S-141, S-144, and S-145 (available from Asahi Glass Co., Ltd.); FLUORAD FC-93, FC-95, FC-98, FC-129, FC-135, FC-170C, FC-430, FC-431, and FC-4430 (available from Sumitomo 3M); MEGAFAC F-470, F-1405, and F474 (available from DIC Corporation); ZONYL FS-300, FSN, FSN-100, FSO, FSO-100, and FS-3100 (available from DuPont Kabushiki Kaisha); EFTOP EF-351, 352, 801, and 802 (available from Jemco Inc.); ET-250 and 251 (available from Neos Company Limited); and PF-151N, PF-136A, and PF-156A (available from Omnova Solutions Inc.).

Among these commercially available products, FSO, FSO-100, FSN, FSN-100, FS-300, and FS-3100 available from DuPont Kabushiki Kaisha are preferable.

Examples of the nonionic surfactants include polyols, glycol ethers, polyoxyethylene alkyl ethers, polyoxyethylene polyoxypropylene alkyl ethers, polyoxyethylene alkyl esters, polyoxyethylene sorbitan fatty acid esters, polyoxyethylene alkylphenyl ethers, polyoxyethylene alkylamines, polyoxyethylene alkylamides, and acetylene glycols.

Examples of the anionic surfactants include polyoxyethylene alkyl ether acetates, dodecylbenzene sulfonates, laurates, and salts of polyoxyethylene alkyl ether sulfates.

Examples of the silicone-based surfactants include polyether-modified silicone compounds.

The polyether-modified silicone compounds are not particularly limited and may be appropriately selected depending on the intended purpose. Examples of the polyether-modified silicone compound include: side-chain types (pendant types) obtained by incorporating a polyether group into a side chain of polysiloxane; one-end types obtained by incorporating a polyether group at one end of polysiloxane; both-end types (ABA types) obtained by incorporating a polyether group at both ends; side-chain-both-end types obtained by incorporating a polyether group into both of a side chain and both ends of polysiloxane; ABn types obtained by repeatedly linking polysiloxane (A) into which a polyether group is incorporated and polysiloxane (B) into which a polyether group is not incorporated; and branched types obtained by incorporating a polyether group at an end of branched polysiloxane.

Among these polyether-modified silicone compounds, side-chain types (pendant types) having a structure obtained by incorporating a polyether group into a side chain of polysiloxane are preferable.

The polyether-modified silicone compounds may be a commercially available product. Examples of the commercially available product include: KF-351A, KF-352A, KF-353, KF-354L, KF-355A, KF-615A, KF-945, KF-618, KF-6011, KF-6015, and KF-6004 (available from Shin-Etsu Chemical Co., Ltd.); SF-3771, SF-8427, SF-8428, SH-3749, SH-8400, FZ-2101, FZ-2104, FZ-2118, FZ-2203, FZ-2207, and L-7604 (Dow Corning Toray Co., Ltd.); and BYK-345, BYK-346, and BYK-348 (available from Byk-Chemie Japan Co., Ltd.).

A compound represented by general formula (IV) below or a compound represented by general formula V below is preferable as the acetylene glycol-based surfactant or an acetylene alcohol-based surfactant. For example, a compound represented by structural formula (VI) below is preferable as general formula (IV).

[General formula IV]

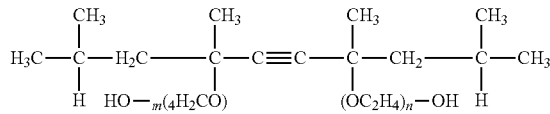

In general formula (IV), m and n each represent an integer of 1 or greater.

[General formula V]

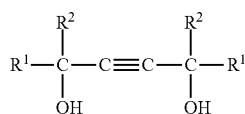

In general formula V, $R^1$ and $R^2$ both represent an alkyl group containing from 1 through 10 carbon atoms. Examples of such an alkyl group include a methyl group, an ethyl group, a propyl group, an isopropyl group, a butyl group, a pentyl group, and a hexyl group.

[Structural formula (VI)]

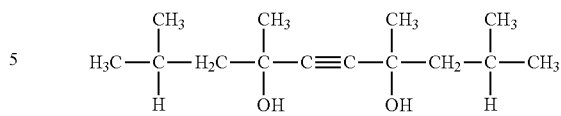

The acetylene glycol-based surfactant or acetylene alcohol-based surfactant may be a commercially available product. Examples of the commercially available product include: DYNOL 604 and DYNOL 607 (available from Air Products and Chemicals, Inc.); SURFYNOL 104, SURFYNOL 420, SURFYNOL 440, and SURFYNOL SE (available from Nissin Chemical Co., Ltd.); and OLFIN E1004, OLFIN E1010, OLFIN EXP.4001, OLFIN EXP.4200, OLFIN EXP.4051F, and OLFIN EXP.4123 (available from Nissin Chemical Co., Ltd.).

A content of the surfactant is preferably 0.05 percent by mass or greater but 5 percent by mass or less and more preferably 0.1 percent by mass or greater but 3 percent by mass or less of the total amount of the ink.

<Other Components>

The other components are not particularly limited and may be appropriately selected depending on the intended purpose. Examples of the other components include a foam suppressor (defoaming agent), a pH regulator, a preservative and fungicide, a chelating reagent, a corrosion inhibitor, an antioxidant, an ultraviolet absorber, an oxygen absorber, and a light stabilizer.

—Foam Suppressor—

The foam suppressor is added in a trace amount in the ink to be used for suppressing foaming of the ink. Here, foaming means that a liquid becomes a thin film to enclose air. Properties of the ink such as surface tension and viscosity contribute to generation of foams. That is, a liquid having a high surface tension such as water does not easily foam because a force of making a surface area of the liquid as small as possible acts in the liquid. In contrast, an ink having a high viscosity and a high permeability easily foams because of a low surface tension, and is hard to defoam because the generated foams tend to be sustained by the viscosity of the solution.

Typically, a foam suppressor breaks foams by locally reducing surface tension of foam films, or a foam suppressor that is insoluble in the foamed liquid breaks foams by scattering on the surface of the foamed liquid. When a fluorosurfactant having an extremely strong function of reducing surface tension of the ink is used in the ink as a surfactant, a foam suppressor having the former mechanism is not typically used because use of such a foam suppressor does not succeed in locally reducing surface tension of foam films. Hence, the latter foam suppressor insoluble in the foamed liquid is used. In this case, however, the foam suppressor insoluble in the solution degrades stability of the ink.

As compared, a foam suppressor represented by general formula (VII) below does not have so strong a function of reducing surface tension as a fluorosurfactant, but is highly compatible with the fluorosurfactant. Hence, it is estimated that the foam suppressor is efficiently taken into foam films, and that difference in surface tension between the fluorosurfactant and the foam suppressor makes surfaces of the foam films locally imbalanced to break the foams.

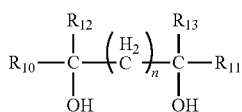

General formula (VII)

In general formula (VII), $R_{10}$ and $R_{11}$ independently represent an alkyl group containing from 3 through 6 carbon atoms, $R_{12}$ and $R_{13}$ independently represent an alkyl group containing from 1 through 2 carbon atoms, and n represents an integer of from 1 through 6.

Examples of compounds represented by general formula (VII) include 2,4,7,9-tetramethyldecane-4,7-diol, and 2,5,8,11-tetramethyldodecane-5,8-diol. Of these compounds, 2,4,7,9-tetramethyldecane-4,7-diol is preferable in terms of satisfying both of foam suppressability and wettability improvement because 2,4,7,9-tetramethyldecane-4,7-diol has not only a foam suppressing effect but also a wettability improving effect.

A content of the foam suppressor is preferably 0.01 percent by mass or greater but 10 percent by mass or less and more preferably 0.1 percent by mass or greater but 5 percent by mass or less of the total amount of the ink. When the content of the foam suppressor is 0.01 percent by mass or greater but 10 percent by mass or less, a good foam suppressing effect can be obtained.

—pH Regulator—

The pH regulator is not particularly limited and may be appropriately selected depending on the intended purpose so long as the pH regulator can regulate pH to from 7 through 11 without adversely affecting the printing ink to which the pH regulator is added. Examples of the pH regulator include alcoholamines, hydroxides of alkali metal elements, hydroxides of ammonium, phosphonium hydroxides, and carbonates of alkali metals.

When pH is 7 or greater but 11 or less, a liquid discharging head or an ink supplying unit is not eroded, and troubles such as quality changes, leakage, and discharging failure of the ink do not occur Examples of the alcoholamines include diethanolamine, triethanolamine, and 2-amino-2-ethyl-1,3-propanediol.

Examples of the hydroxides of alkali metal elements include lithium hydroxide, sodium hydroxide, and potassium hydroxide.

Examples of the hydroxides of ammonium include ammonium hydroxide, quaternary ammonium hydroxide, and quaternary phosphonium hydroxide.

Examples of the carbonates of alkali metals include lithium carbonate, sodium carbonate, and potassium carbonate.

Examples of the preservative and fungicide include sodium dehydroacetate, sodium sorbate, sodium 2-pyridinethiol-1-oxide, sodium benzoate, and pentachlorophenol sodium.

Examples of the chelating reagent include sodium ethylenediamine tetraacetate, sodium nitrilotriacetate, sodium hydroxyethyl ethylenediamine triacetate, sodium diethylene triamine pentaacetate, and sodium uramil diacetate.

Examples of the corrosion inhibitor include acidic sulfites, sodium thiosulfate, ammonium thiodiglycolate, diisopropyl ammonium nitrite, pentaerythritol tetranitrate, and dicyclohexylammonium nitrite.

Examples of the antioxidant include phenol-based antioxidants (including hindered phenol-based antioxidants), amine-based antioxidants, sulfur-based antioxidants, and phosphorus-based antioxidants.

Examples of the ultraviolet absorber include benzophenone-based ultraviolet absorbers, benzotriazole-based ultraviolet absorbers, salicylate-based ultraviolet absorbers, cyanoacrylate-based ultraviolet absorbers, and nickel complex salt-based ultraviolet absorbers.

<Ink Producing Method>

The ink can be produced by dispersing or dissolving the coloring material, the organic solvent, the resin particles, the amine compound, and the water, and as needed, the other components in an aqueous medium, and as needed, stirring and mixing the materials. The stirring and mixing can be performed with, for example, a sand mill, a homogenizer, a ball mill, a paint shaker, an ultrasonic disperser, a stirrer using a typical stirring blade, a magnetic stirrer, and a high-speed disperser.

—Properties of Ink—

Properties of the ink are not particularly limited and may be appropriately selected depending on the intended purpose. For example, viscosity, surface tension, and a volume average particle diameter of a solid content are preferably in the following ranges.

The viscosity of the ink at 25 degrees C. is preferably 5 mPa·s or greater but 25 mPa·s or less and more preferably 6 mPa·s or greater but 20 mPa·s or less. When the viscosity of the ink is 5 mPa·s or greater, an effect of improving print density and text quality can be obtained. On the other hand, when the viscosity of the ink is suppressed to 25 mPa·s or less, dischargeability can be ensured.

The viscosity can be measured with, for example, a viscometer (RE-550L available from Toki Sangyo Co., Ltd.) at 25 degrees C.

The surface tension of the ink is preferably 20 mN/m or greater but 35 mN/m or less and more preferably 20 mN/m or greater but 27 mN/m or less.

When the surface tension is 35 mN/m or less, the ink can wet and spread on a print medium, and a high image density can be obtained.

The volume average particle diameter of a solid content of the ink is not particularly limited and may be appropriately selected depending on the intended purpose. However, the volume average particle diameter of the solid content is preferably 20 nm or greater but 1,000 nm or less and more preferably 20 nm or greater but 150 nm or less in order to improve discharging stability and image qualities such as image density. The solid content includes the resin particles and particles of the pigment. The volume average particle diameter can be measured with, for example, a particle size analyzer (NANOTRAC UPA-EX150 available from Nikkiso Co., Ltd.).

The ink of the present disclosure can be favorably used in printers mounted with, as liquid discharging heads, any types of inkjet heads such a so-called piezo type (see Japanese Examined Patent Publication No. 02-51734) using a piezoelectric element as a pressure generating unit to pressurize the ink in an ink flow path to deform a vibration plate constituting a wall surface of the ink flow path and change the internal capacity of the ink flow path to discharge ink droplets, a so-called thermal type (see Japanese Examined Patent Publication No. 61-59911) using a heating resistor to heat the ink in an ink flow path and generate bubbles, and an electrostatic type (see Japanese Unexamined Patent Application Publication No. 06-71882) using a vibration plate constituting a wall surface of an ink flow path and an electrode disposed counter to the vibration plate to deform the vibration plate by the effect of an electrostatic force generated between the vibration plate and the electrode and change the internal capacity of the ink flow path to discharge ink droplets.

<Print Medium>

The print medium is not particularly limited and may be appropriately selected depending on the intended purpose. Examples of the print medium include plain paper, gloss paper, special paper, cloth, film, OHP sheets, and printing paper for general purposes. One of these print media may be used alone or two or more of these print media may be used in combination.

(Ink Stored Container)

An ink stored container of the present disclosure includes the ink of the present disclosure and a container storing the ink, and further includes other members appropriately selected as needed.

The container is not particularly limited and may be of any shape, any structure, any size, any material, etc. that may be appropriately selected depending on the intended purpose. Preferable examples of the container include a container including at least an ink bag formed of, for example, aluminum laminate film or resin film.

(Image Forming Method and Liquid Discharging Apparatus)

An image forming method of the present disclosure includes at least an ink discharging step, and further includes other steps appropriately selected as needed, such as a heating step, a stimulus generating step, and a controlling step.

A liquid discharging apparatus of the present disclosure includes at least an ink discharging unit, and further includes other units appropriately selected as needed, such as a heating unit, a stimulus generating unit, and a controlling unit.

The image forming method of the present disclosure can be favorably performed by the liquid discharging apparatus of the present disclosure. The ink discharging step can be favorably performed by the ink discharging unit. The other steps can be favorably performed by the other units.

<Ink Discharging Step and Ink Discharging Unit>

The ink discharging step is a step of applying a stimulus to the ink of the present disclosure to discharge the ink onto a print medium and form an image on the print medium, and is performed by the ink discharging unit.

A method for discharging the ink onto printing paper and forming an image on the printing paper in the ink discharging step may be any of known inkjet printing methods. Examples of the known inkjet printing methods include an inkjet printing method of a head scanning type, and an inkjet printing method using a line head to perform image printing on printing paper on a sheet-by-sheet basis.

A system for driving a printing head, which is the ink discharging unit, is not particularly limited. Examples of the system include: piezoelectric element actuators using, for example, PZT; systems configured to apply a thermal energy; and on-demand heads using, for example, actuators utilizing an electrostatic force. It is also possible to perform printing with continuous inkjet heads of a charge control type.

The stimulus can be generated by, for example, the stimulus generating unit. The stimulus is not particularly limited and may be appropriately selected depending on the intended purpose. Examples of the stimulus include heat (temperature), pressure, vibration, and light. One of these stimuli may be used alone or two or more of these stimuli may be used in combination. Among these stimuli, heat and pressure are preferable.

Examples of the stimulus generating unit include heating devices, pressure devices, piezoelectric elements, vibration generating devices, ultrasonic oscillators, and lights. Specific examples of the stimulus generating unit include: piezoelectric actuators such as piezoelectric elements; thermal actuators using an electro-thermal converting element such as a heating resistor to utilize a phase change upon film boiling of a liquid; shape memory alloy actuators utilizing a phase change of a metal upon a temperature change; and electrostatic actuators utilizing an electrostatic force.

A method for discharging the ink is not particularly limited and is different depending on, for example, the kind of the stimulus. For example, when the stimulus is "heat", there is a method using, for example, a thermal head for applying a thermal energy corresponding to a printing signal to the ink in the liquid discharging head to generate bubbles in the ink by the thermal energy and discharge and jet the ink from nozzle holes of the liquid discharging head in a form of liquid droplets by a pressure of the bubbles. When the stimulus is "pressure", there is a method for, for example, applying a voltage to a piezoelectric element bonded to a position called a pressure chamber present in an ink flow path in the liquid discharging head to flex the piezoelectric element and shrink the capacity of the pressure chamber to discharge and jet the ink from nozzle holes of the liquid discharging head in a form of liquid droplets.

A size of the liquid droplets of the ink to be discharged is preferably 3 pl or greater but 40 pl or less. A discharging/jetting speed of the liquid droplets of the ink is preferably 5 m/s or higher but 20 m/s or lower. A driving frequency for discharging the liquid droplets of the ink is preferably 1 kHz or higher. A resolution of the liquid droplets of the ink is preferably 300 dpi or higher.

<Other Steps and Other Units>

In the image forming method, a heating/drying step of heating and drying, as needed, a print medium onto which the ink is discharged may be provided as needed. In this case, printing paper may be dried with an infrared dryer, a microwave dryer, a roll heater, a drum heater, or hot air. As a method for smoothing an image-formed surface and fixing the image, a fixing step of heating and thermally fixing the image with a heating unit at 100 degrees C. or higher but 150 degrees C. or lower may be provided. With the fixing step, gloss and fixability of an image printed matter are improved. Preferable examples of the fixing unit include a roller and a drum heater that include a heated mirror surface. The mirror surface portion (smoothing portion) of the roll heater or drum heater can be brought into contact with the image-formed surface. A fixing roller heated to a heating temperature of 100 degrees C. or higher but 150 degrees C. or lower is preferable in consideration of image qualities, safety, and cost efficiency.

The controlling unit is not particularly limited and may be appropriately selected depending on the intended purpose so long as the controlling unit is capable of controlling the operations of each unit. Examples of the controlling unit include devices such as a sequencer and a computer.

An example of the image forming method and the liquid discharging apparatus of the present disclosure will be described with reference to the drawings.

FIG. 1 is an exemplary view of a liquid discharging apparatus to which the present disclosure is applied. The liquid discharging apparatus 300 to which the present disclosure is applied includes a print medium conveying unit 301, a pre-processing step unit 302 configured to coat a pre-processing fluid on a print medium 203, an image forming step unit 304, and a post-processing step unit 305 configured to coat a post-processing fluid on the print medium that has undergone the image forming step.

The print medium conveying unit 301 includes a paper feeding device 307, a plurality of conveying rollers, and a take-up device 308. The print medium 203 in FIG. 1 is continuous paper (roll paper) wound up in a roll form. The print medium 203 is unwound from the paper feeding device by the conveying rollers, conveyed on a platen, and taken up by the take-up device 308.

The print medium 203 conveyed from the print medium conveying unit 301 is coated with the pre-processing fluid in the pre-processing step unit 302 of FIG. 1. According to inkjet printing methods, when images are formed on print media other than inkjet paper, problems surrounding qualities such as feathering, density, color tone, and ghosting occur, or problems surrounding image fastness such as water resistance and weather resistance occur. As a method for overcoming these problems, a technique of coating the pre-processing fluid having a function of coagulating the ink on the print medium before an image is formed on the print medium is applied to improve image qualities.

The pre-processing step is not particularly limited, and may use a coating method for uniformly coating the pre-processing fluid on a surface of printing paper. Examples of the coating method include a blade coating method, a gravure coating method, a gravure offset coating method, a bar coating method, a roll coating method, a knife coating method, an air knife coating method, a comma coating method, a U-comma coating method, an AKKU coating method, a smoothing coating method, a microgravure coating method, a reverse roll coating method, a 4- or 5-roll coating method, a dip coating method, a curtain coating method, a slide coating method, and a die coating method. One of these coating methods may be used alone or two or more of these coating methods may be used in combination.

Figure 2:
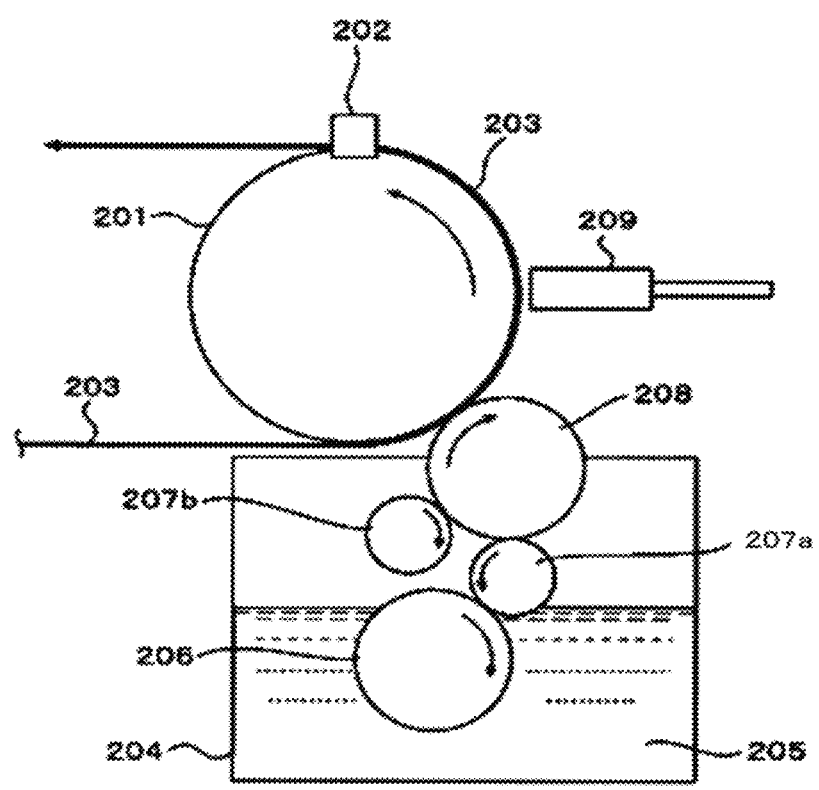
FIG. 2 is an enlarged schematic view illustrating an example of a pre-processing fluid coating device according to an embodiment of the present disclosure.

FIG. 2 is a schematic view of the pre-processing step unit 302 according to the present embodiment. In this example, a roll coating method will be described. However, any other pre-processing fluid coating method may be used.

As illustrated in FIG. 2, the print medium 203, which may be continuous paper, is conveyed by a conveying roller 201 into a pre-processing fluid coating device 204. A pre-processing fluid 205 is stored in the pre-processing fluid coating device 204. The pre-processing fluid 205 is transferred onto a roller surface of a coating roller 208 in the form of a thin film by a stirring/supplying roller 206 and transfer/thin film forming rollers 207.

The coating roller 208 rotates while being pressed onto a platen roller 202 that is rotating, and coats the pre-processing fluid 205 on the surface of the print medium 203 when the print medium 203 passes through between the coating roller 208 and the platen roller 202.

A nip pressure of the platen roller 202 for coating the pre-processing fluid can be adjusted by a pressure adjusting device 209. It is possible to change an amount of the pre-processing fluid 205 to be coated, by changing the nip pressure. It is also possible to adjust the coating amount, by changing the rotation speeds of the coating roller 208 and the platen roller 202. The coating roller 208 and the platen roller 202 are driven by a power source such as a driving motor (unillustrated). It is possible to adjust the coating amount, by changing the energy of the power source and thusly changing the rotation speeds.

As can be understood, the method of coating the pre-processing fluid 205 for improving the image qualities on a print region of the print medium 203 by means of the coating roller 208 can coat the pre-processing fluid 205 having a relatively high viscosity on the print medium 203 more thinly than a method of spraying a processing fluid onto the print medium by means of a jet head. Therefore, the coating method is more advantageous in reducing, for example, feathering of images.

As illustrated in FIG. 1, the pre-processing unit may be provided with a post-pre-processing drying unit 303 after the coating step.

The post-pre-processing drying device includes, for example, heat rollers 311 and 312 as illustrated in FIG. 1. According to this device, the continuous paper coated with the pre-processing fluid is conveyed by a conveying roller to the heat rollers. The heat rollers are heated to a high temperature of 50 degrees C. or higher but 100 degrees C. or lower. Contact heat transfer from the heat rollers evaporates a water content from the continuous paper coated with the pre-processing fluid, to dry the continuous paper.

The drying unit is not particularly limited and may be appropriately selected depending on the intended purpose. Examples of the drying unit include an infrared dryer, a microwave dryer, and a hot air device. For example, it is possible to combine, for example, a heat roller and a hot air device, instead of using a single device. Although not illustrated, it is also effective to heat a print medium before coating the pre-processing liquid (addition of a pre-heating step).

In the image forming step unit, an image corresponding to image data is formed on the print medium that has undergone the pre-processing step.

Figure 3:
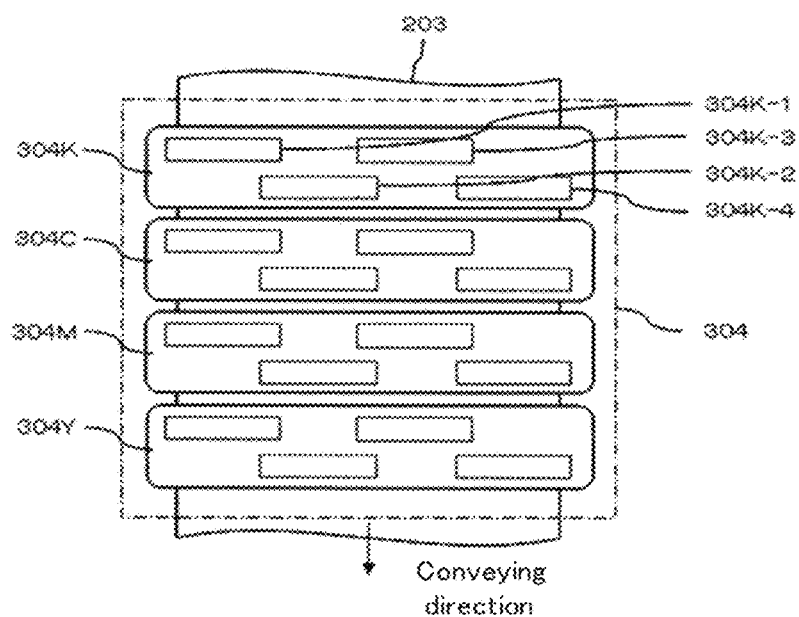
FIG. 3 is a schematic view illustrating an example of a liquid discharging head used in a liquid discharging apparatus according to an embodiment of the present disclosure.
Figure 4:
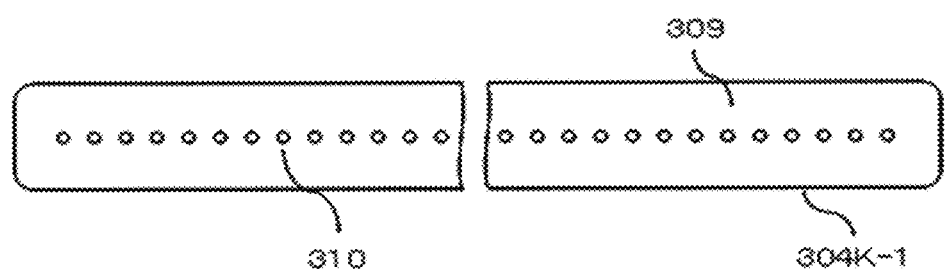
FIG. 4 is an enlarged schematic view illustrating an example of a liquid discharging head used in a liquid discharging apparatus according to an embodiment of the present disclosure.

The image forming step unit 304 is a full-line-type head, and includes four printing heads 304K, 304C, 304M, and 304Y that are arranged in this order from the upstream side in a print medium conveying direction and are capable of handling black (K), cyan (C), magenta (M), and yellow (Y). As illustrated in FIG. 3, a print region width of, for example, the printing head 304K for black (K) is secured by staggered arrangement of four short head units 304K-1, 304K-2, 304K-3, and 304K-4 in a direction orthogonal to the conveying direction. FIG. 4 is an enlarged view of the head unit 304K-1. As illustrated in FIG. 4, a plurality of printing nozzles 310 are arranged and constitute a nozzle line on a nozzle surface 309 of the head unit 304K-1 in a longer direction of the head unit 304K-1. In the present embodiment, there is one nozzle line. However, a plurality of nozzle lines may be provided. The other printing heads 304C, 304M, and 304Y have the same configuration. The four printing heads 304K, 304C, 304M, and 304Y are arranged at the same pitch in the conveying direction. This enables an image to be formed all over the print region width with one printing operation.

The kinds of inks are not limited to K, C, M, and Y, but photo inks such as light cyan may also be used.

The print medium that has undergone the image forming step is coated with the post-processing fluid in the post-processing step unit 305. The post-processing fluid described below contains a component that can form a transparent protective layer on the print medium.

In the post-processing step, the post-processing fluid may be coated all over the image surface on the print medium or on only a specific part of the image surface. More preferably, it is preferable to change the coating amount and the coating method depending on the printing conditions (e.g., the kind of the print medium and the amount of the ink discharged on the paper).

A method for coating the post-processing fluid is not particularly limited, and various methods are appropriately selected depending on the kind of the post-processing fluid.

It is preferable to use either the same method as the coating method for the pre-processing fluid, or the same method as the above-described method for discharging the ink. Of these methods, the same method as the method for discharging the ink is particularly preferable in terms of device configuration and storage stability of the post-processing fluid. This method can coat a needed amount of the fluid at an arbitrary position on the image. The post-processing step is a step of delivering the post-processing fluid containing a transparent resin onto the surface of the formed image such that the dry basis amount of the fluid attached will be 0.5 g/m$^2$ or greater but 10 g/m$^2$ or less, to form a protective layer.

The dry basis amount of the post-processing fluid attached is preferably 0.5 g/m$^2$ or greater but 10 g/m$^2$ or less and more preferably 2 g/m$^2$ or greater but 8 g/m$^2$ or less. When the amount of the fluid attached is 0.5 g/m$^2$ or greater, image qualities (image density, saturation, gloss, and fixability) can be improved. When the amount of the fluid attached is 10 g/m$^2$ or less, a drying property of the protective layer is improved, and an effect of improving image qualities is obtained.

As illustrated in FIG. 1, the post-processing unit may be provided with a post-post-processing drying unit 306. The post-post-processing drying device includes, for example, heat rollers 313 and 314 as illustrated in FIG. 1. According to this device, the continuous paper coated with the post-processing fluid is conveyed by a conveying roller to the heat rollers. The heat rollers are heated to a high temperature. Contact heat transfer from the heat rollers evaporates a water content from the continuous paper coated with the post-processing fluid, to dry the continuous paper.

The drying unit is not particularly limited and may be appropriately selected depending on the intended purpose. Examples of the drying unit include an infrared dryer, a microwave dryer, and a hot air device. For example, it is possible to combine, for example, a heat roller and a hot air device, instead of using a single device. The paper after dried is taken up by the take-up device 308. When the pressing force during the take-up is high, the image may be transferred to the back surface. In order to prevent transfer, a pre-take-up drying unit 316 as illustrated in FIG. 1 may be provided as needed. The configuration described above (e.g., a combination of a heat roller and a hot air device) may be employed as this drying unit.

Figure 5:
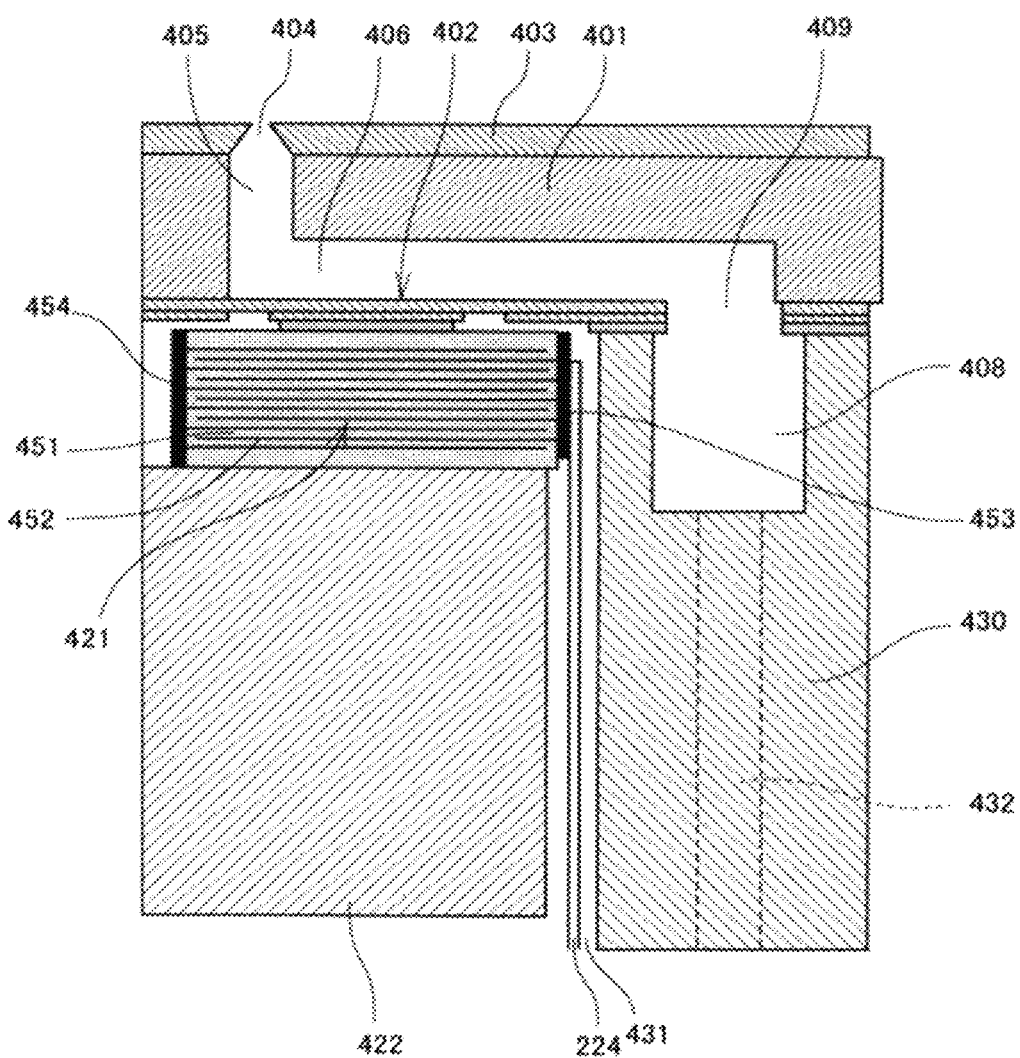
FIG. 5 is a schematic cross-sectional view of a liquid discharging head taken along a longer direction of a liquid chamber.
Figure 6:
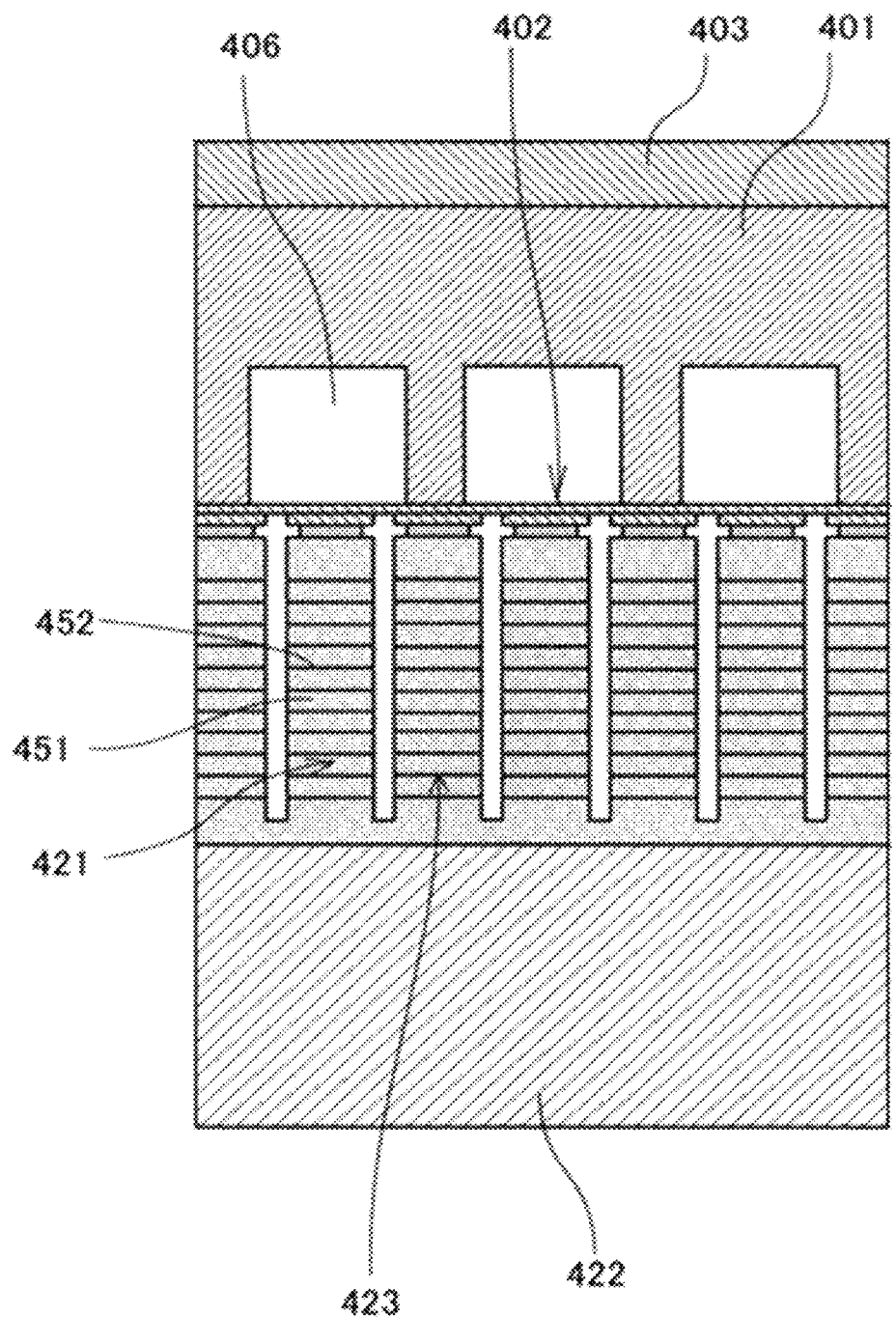
FIG. 6 is a schematic cross-sectional view of a liquid discharging head taken along a shorter direction of a liquid chamber.

Next, an example of a liquid discharging head in the liquid discharging apparatus will be described with reference to FIG. 5 and FIG. 6. FIG. 5 is a view illustrating a cross-section of the head taken along a longer direction of a liquid chamber. FIG. 6 is a view illustrating a cross-section of the head taken along a shorter direction (a direction in which nozzles are arranged) of the liquid chamber.

In the liquid discharging head, a flow path plate 401 formed by anisotropic etching of a monocrystal silicon substrate, a vibration plate 402 formed by, for example, nickel electroforming and bonded on the lower surface of the flow path plate 401, and a nozzle plate 403 bonded on the upper surface of the flow path plate 401 are laminated by bonding. A nozzle linking path 405 and a liquid chamber 406, which are a flow path linking to a nozzle 404 from which liquid droplets (ink droplets) are discharged, and an ink supplying port 409 linking to a common liquid chamber 408 for supplying an ink into the liquid chamber 406 are formed by the flow path plate, the vibration plate, and the nozzle plate.

The liquid discharging head includes: two lines of laminated piezoelectric elements 421 (only one line is illustrated in FIG. 5), which are electro-mechanical converting elements to function as pressure generating units (actuator units) configured to deform the vibration plate 402 and pressurize the ink in the liquid chamber 406; and a base substrate 422 on which the piezoelectric elements 421 are bonded and secured. A column 423 is provided in the piezoelectric element 421. The column 423 is a portion formed at the same time as the piezoelectric element 421 by partitioning a piezoelectric element member. However, the column 423 functions merely as a support column because a driving voltage is not applied to the column.

A FPC cable 224 configured to couple the piezoelectric element 421 to an unillustrated driving circuit (driving IC) is coupled to the piezoelectric element 421.

A peripheral portion of the vibration plate 402 is bonded to a frame member 430. The frame member 430 has: a bored portion 431 in which an actuator unit including the piezoelectric element 421 and the base substrate 422 is stored; a recessed portion constituting the common liquid chamber 408; and an ink supplying hole 432 configured to supply an ink into the common liquid chamber 408 from outside. The frame member 430 is formed by injection molding of a thermosetting resin such as epoxy resin or polyphenylene sulfite.

The flow path plate 401 has a hole portion and a recessed portion that are to function as the nozzle linking path 405 and the liquid chamber 406. The hole portion and the recessed portion are formed by, for example, anisotropic etching of a monocrystal silicon substrate having a crystal face orientation (110), with an alkaline etchant such as a potassium hydroxide aqueous solution (KOH). The flow path plate is not limited to a monocrystal silicon substrate, but other stainless steel substrates and photosensitive resins may also be used.

The vibration plate 402 is formed of a metal plate of nickel. The vibration plate 402 is formed by, for example, an electroforming method. Other metal plates or members obtained by bonding a metal with a resin plate may also be used. The piezoelectric element 421 and the column 423 are bonded to the vibration plate 402 with an adhesive, and the frame member 430 is also bonded to the vibration plate 402 with an adhesive.

The nozzle plate 403 has nozzles 404 having a diameter of from 10 μm through 30 μm at positions corresponding to liquid chambers 406. The nozzle plate 403 is bonded to the flow path plate 401 with an adhesive. The nozzle plate 403 is a nozzle forming member which is formed of a metal material and on which, via a predetermined layer, a water repellent layer is formed as an outermost layer.

The piezoelectric element 421 is a laminated piezoelectric element (here, PZT) in which piezoelectric materials 451 and internal electrodes 452 are alternately laminated. Individual electrodes 453 and a common electrode 454 are coupled to the internal electrodes 452 that are led out to alternately different ones of the end surfaces of the piezoelectric element 421. In the present embodiment, the piezoelectric element 421 is configured to pressurize the ink in the liquid chamber 406 by displacement in d33 orientation as the piezoelectric orientation. However, the piezoelectric element 421 may also be configured to pressurize the ink in the liquid chamber 406 by displacement in d31 orientation as the piezoelectric orientation. It is also possible to configure a structure in which one line of piezoelectric element 421 is provided on one substrate 422.

In the liquid discharging head having this configuration, for example, the voltage to be applied to the piezoelectric element 421 is lowered from a reference potential to contract the piezoelectric element 421 to lift down the vibration plate 402 and expand the capacity of the liquid chamber 406 to cause the ink to flow into the liquid chamber 406, and subsequently, the voltage applied to the piezoelectric element 421 is raised to extend the piezoelectric element 421 in the lamination direction to deform the vibration plate 402 in the direction toward the nozzle 404 and contract the capacity/volume of the liquid chamber 406 to pressurize the printing liquid in the liquid chamber 406 and discharge (jet) the droplets of the printing liquid from the nozzle 404.

Then, the voltage applied to the piezoelectric element 421 is returned to the reference voltage to restore the vibration plate 402 to the initial position and expand the liquid chamber 406. This generates a negative pressure to cause the liquid chamber 406 to be filled with the printing liquid from the common liquid chamber 408. Hence, after vibration of the meniscus surface of the nozzle 404 attenuates and stabilizes, the operation moves on to the next liquid discharging.

The method for driving the liquid discharging head is not limited to the above-described example (pull-push ejection). Depending on how to apply a drive waveform, pull ejection or push ejection is also possible.

In the present disclosure, a so-called piezo type (see Japanese Examined Patent Publication No. 02-51734) using a piezoelectric element as a pressure generating unit to pressurize the ink in the ink flow path to deform the vibration plate constituting a wall surface of the ink flow path and change the internal capacity of the ink flow path to discharge ink droplets is used. However, it is also possible to use a so-called thermal type (see Japanese Examined Patent Publication No. 61-59911) using a heating resistor to heat the ink in an ink flow path and generate bubbles, and an electrostatic type (see Japanese Unexamined Patent Application Publication No. 06-71882) using a vibration plate constituting a wall surface of an ink flow path and an electrode disposed counter to the vibration plate to deform the vibration plate by the effect of an electrostatic force generated between the vibration plate and the electrode and change the internal capacity of the ink flow path to discharge ink droplets.

(Image)

An image of the present disclosure is an image on a print medium. The image contains a coloring material, resin particles, and an amine compound. The resin particles contain urethane resin particles, and urethane-modified acrylic resin particles including a core portion containing an acrylic resin and a shell portion formed on a surface of the core portion and containing at least a urethane resin. The amine compound has a boiling point of 120 degrees C. or higher but 200 degrees C. or lower and a molecular weight of 100 or less.

The method in which the ink is used is not limited to an inkjet printing method, but the ink can be used in a wide variety of methods. Examples of the methods other than an inkjet printing method include a blade coating method, a gravure coating method, a bar coating method, a roll coating method, a dip coating method, a curtain coating method, a slide coating method, a the coating method, and a spray coating method.

The applications of the ink of the present disclosure are not particularly limited and can be suitably selected to suit to a particular application. For example, the ink can be used for printed matter, a paint, a coating material, and foundation. The ink can be used to form two-dimensional texts and images and furthermore a three-dimensional solid object (3D modeling object) as a material for 3D modeling.

A three-dimensional object fabricating apparatus for fabricating a three-dimensional object can be any known device with no particular limit. For example, the three-dimensional object fabricating apparatus includes an ink container, a supplying device, and a discharging device, a drier, etc. The three-dimensional solid object includes an object manufactured by re-applying ink. In addition, the three-dimensional solid object can be manufactured by processing a structure having a substrate such as a print medium printed with the ink as a molded processed product. The molded processed product is fabricated by, for example, heating drawing or punching a structure or printed matter having a sheet-like form, film-like form, etc. The molded processed product is suitable for what is molded after surface-decorating. Examples thereof are gauges or operation panels of vehicles, office machines, electric and electronic machines, cameras, etc.

EXAMPLES

The present disclosure will be described by way of Examples. However, the present disclosure should not be construed as being limited to the Examples.

Preparation Example 1

—Preparation of Self-Dispersible Pigment Dispersion Liquid—

In a PROCESS ALL 4HV mixer (4 L), ion-exchanged highly pure water (1 L) and 4-aminobenzoic acid (1 mol) were added to BLACK PEARLS (registered trademark) 880 available from Cabot Corporation (carbon black having a BET surface area of 220 $m^2/g$ and DBPA of 105 mL/100 g) (500 g).

Subsequently, the mixture was strongly mixed at 300 rpm for 10 minutes while being heated to 60 degrees C. To the resultant, a 20 percent by mass sodium nitrite aqueous solution (1 molar equivalent based on 4-aminobenzoic acid) was added for 15 minutes. These materials were mixed and stirred for 3 hours while being heated to 60 degrees C. The reaction product was extracted while being diluted with ion-exchanged highly pure water (750 mL). Subsequently, the reaction product was adjusted to pH of 9 with a 10 percent by mass tetrabutyl ammonium hydroxide solution (methanol solution), to obtain a reformed pigment dispersion 30 minutes later.

Subsequently, the obtained reformed pigment dispersion containing the pigment bound with at least one aminobenzoic acid group or aminobenzoic acid tetrabutylammonium salt and ion-exchanged highly pure water were subjected to ultrafiltration through a dialysis membrane and then subjected to ultrasonic dispersion, to obtain a reformed pigment dispersion concentrated to a pigment solid content of 20 percent by mass.

The surface treatment level of the obtained dispersion was 0.5 mmol/g. The volume average particle diameter of the obtained dispersion measured with a particle size distribution measuring instrument (NANOTRAC UPA-EX150 available from Nikkiso Co., Ltd.) was 104 nm.

Preparation Example 2

<Preparation of Resin-Coated Pigment Dispersion Liquid>
—Preparation of Polymer Solution A—

A 1 L flask equipped with a mechanical stirrer, a thermometer, a nitrogen gas introducing tube, a reflux condenser, and a dropping funnel was sufficiently purged with a nitrogen gas, and then styrene (11.2 g), acrylic acid (2.8 g), lauryl methacrylate (12.0 g), polyethylene glycol methacrylate (4.0 g), a styrene macromer (4.0 g), and mercaptoethanol (0.4 g) were mixed and heated to 65 degrees C. in the flask. Subsequently, a mixture solution of styrene (100.8 g), acrylic acid (25.2 g), lauryl methacrylate (108.0 g), polyethylene glycol methacrylate (36.0 g), hydroxyethyl methacrylate (60.0 g), a styrene macromer (36.0 g), mercaptoethanol (3.6 g), azobismethylvaleronitrile (2.4 g), and methyl ethyl ketone (18 g) was dropped into the flask for 2.5 hours. After dropping, a mixture solution of azobismethylvaleronitrile (0.8 g) and methyl ethyl ketone (18 g) was dropped into the flask for 0.5 hours. The materials in the flask were aged at 65 degrees C. for 1 hour, azobismethylvaleronitrile (0.8 g) was added, and the resultant was further aged for 1 hour. After the reaction ended, methyl ethyl ketone (364 g) was added in the flask, to obtain a polymer solution A (800 g) having a concentration of 50 percent by mass.

—Preparation of Carbon Black Pigment-Containing Polymer Particle Dispersion Liquid—

The polymer solution A (28 g), C.I. carbon black (available from Degussa AG, FW100) (42 g), a 1 mol/L potassium hydroxide aqueous solution (13.6 g), methyl ethyl ketone (20 g), and ion-exchanged water (13.6 g) were stirred sufficiently, and then kneaded with a roll mill. The obtained paste was fed into pure water (200 g) and sufficiently stirred. Then, from the resultant, methyl ethyl ketone and water were evaporated with an evaporator. This dispersion liquid was subjected to pressure filtration through a polyvinylidene fluoride membrane filter having an average pore diameter of 5.0 μm to remove coarse particles, to obtain a carbon black pigment-containing polymer particle dispersion liquid having a pigment solid content of 15 percent by mass and a solid concentration of 20 percent by mass.

The volume average particle diameter of the polymer particles in the obtained carbon black pigment-containing polymer particle dispersion liquid was measured with a particle size distribution measuring instrument (NANOTRAC UPA-EX150 available from Nikkiso Co., Ltd.), and was 104 nm.

Preparation Example 3

—Preparation of Urethane Resin Water Dispersion—

A crystalline polycarbonate diol having a number average molecular weight (Mn) of 2,000 [DURANOL T6002, available from Asahi Kasei Chemicals Corporation] (287.9 parts by mass), 1,4-butanediol (3.6 parts by mass), DMPA (dimethylolpropionic acid) (8.9 parts by mass), 4,4-dicyclohexylmethane diisocyanate (hydrogenated MDI) (98.3 parts by mass), and acetone (326.2 parts by mass) were fed into a simple pressurizing reactor equipped with a stirrer and a heater while nitrogen was introduced into the reactor.

Subsequently, the materials were heated to 90 degrees C. and allowed to undergo a urethanation reaction for 8 hours, to produce a prepolymer.

The reaction mixture was cooled to 40 degrees C. Triethylamine (6.8 parts by mass) was added to the reaction mixture and mixed. Water (568.8 parts by mass) was further added to the reaction mixture. The reaction mixture was emulsified with a rotor-stator-type mechanical emulsifier to obtain an aqueous dispersion.

A 10 percent by mass ethylenediamine aqueous solution (28.1 parts by mass) was added to the obtained aqueous dispersion under stirring, and stirred at 50 degrees C. for 5 hours, for a chain elongation reaction. Subsequently, acetone was removed from the resultant at reduced pressure at 65 degrees C., and the resultant was adjusted in water content, to obtain a urethane resin water dispersion having a solid concentration of 40 percent by mass.

The volume average particle diameter of the obtained urethane resin water dispersion measured with a particle size distribution measuring instrument (NANOTRAC UPA-EX150 available from Nikkiso Co., Ltd.) was 49 nm.

Preparation Example 4

—Urethane-Modified Acrylic Resin Water Dispersion—

An acrylic/urethane hybrid-type microemulsion (WEM-200U available from Taisei Fine Chemical Co., Ltd., with a urethane/acrylic ratio of 5/5, a solid concentration of 38 percent by mass, and pH of 7) was prepared as a urethane-modified acrylic resin water dispersion.

Example 1

—Production of Ink—

1,3-Butanediol (20.00 parts by mass), 3-methyl-1,3-butanediol (10.00 parts by mass), triethylene glycol (8.00 parts by mass), 2,2,4-trimethyl-1,3-pentanediol (2.00 parts by mass), a fluorosurfactant (FS3100 available from DuPont Kabushiki Kaisha) (0.50 parts by mass), and aminomethyl propanol (with a boiling point of 165 degrees C. and a molecular weight of 89) (0.50 parts by mass) were fed into a container equipped with a stirrer and stirred for about 30 minutes to a uniform state.

Subsequently, the self-dispersible pigment dispersion liquid (with a pigment solid concentration of 20 percent by mass) of Preparation example 1 (37.50 parts by mass) and highly pure water (balance) (total: 100.00 parts by mass) were added to the container, and the materials were stirred for about 60 minutes to a uniform state. Further, the urethane resin water dispersion (with a solid concentration of 40 percent by mass) of Preparation example 3 (10.00 parts by mass) and the urethane-modified acrylic resin water dispersion (with a solid concentration of 38 percent by mass) of Preparation example 4 (2.63 parts by mass) were added to the container, and the materials were stirred for 30 minutes to make the ink uniform.

Subsequently, the obtained ink was subjected to pressure filtration through a polyvinylidene fluoride membrane filter having an average pore diameter of 1.2 μm to remove coarse particles and dusts, to produce an ink of Example 1.

Examples 2 to 14 and Comparative Examples 1 to 5

Inks of Examples 2 to 14 and Comparative Examples 1 to 5 were produced in the same manner as in Example 1, except that the composition and contents used in Example 1 were changed to the composition and contents presented in Table 1 to Table 4.

Subsequently, various properties of the produced inks were evaluated in the manners described below. The results are presented in Table 1 to Table 4.

<Viscosity of Ink>

The viscosity of each ink was measured with a viscometer (RE-550L available from Toki Sangyo Co., Ltd.) at 25 degrees C.

<pH of Ink>

The pH of each ink was measured with a pH meter (HM-30R TYPE available from DKK-TOA Corporation) at 25 degrees C.

<Volume Average Particle Diameter of Solid Content of Ink>

The ink was diluted with pure water such that a solid concentration would be 0.01 percent by mass, and the volume average particle diameter of the solid content was measured with a particle size distribution measuring instrument (NANOTRAC UPA-EX150 available from Nikkiso Co., Ltd.).

<Ink Flowability after Water Evaporation (Maintenance Property)>

Each ink was weighed out in 2.5 g and collected in a petri dish made of glass and having a diameter of 33 mm, using a precision even electronic balance (MSA524S-000-DU available from Sartorius AG) capable of measuring the weight to four decimal places. Subsequently, the weighed-out ink was stored at normal temperature in a thermo-hygrostat (MODEL PL-3KP available from Espec Corp.) having a temperature of 32±0.5 degrees C. and a relative humidity of 30±5 percent, and the sample was taken out 24 hours later to measure the mass. Subsequently, the ink in the petri dish was stirred with a spatula such that the bottom of the petri dish would be seen, and ink flowability after water evaporation was evaluated according to the criteria described below. With a poor ink flowability, waste ink would thicken and coagulate upon water evaporation to degrade maintenance property.

[Evaluation Criteria]

A: The bottom of the petri dish was filled with the ink to become unseen within 5 seconds from the end of the stirring (ink flowability was good).

B: The bottom of the petri dish was filled with the ink to become unseen within 60 seconds from the end of the stirring (ink flowability was average).

C: The bottom of the petri dish remained seen even when 2 or more minutes passed from the end of the stirring (ink flowability was poor).

<Storage Stability of Ink>

A polyethylene container (60 mL) was filled with each ink (50 mL), sealed, and stored at 70 degrees C. for 2 weeks. The viscosity of the ink after the storage was measured. A viscosity change rate was calculated according to a mathematical formula below based on the viscosity of the ink before the storage, and evaluated according to the criteria described below.

Viscosity change rate (%)=[(ink viscosity after storage−ink viscosity before storage)/ink viscosity before storage]×100

The viscosity was measured with a viscometer (RE500L available from Toki Sangyo Co., Ltd.) at 25 degrees C.

[Evaluation Criteria]

A: Less than 5 percent

B: 5 percent or greater but less than 10 percent

C: 10 percent or greater

<Image Formation>

Under environmental conditions adjusted to 23±0.5 degrees C. and 50±5 percent RH, an inkjet printing apparatus (IPSIO GXE-5500 available from Ricoh Company, Ltd.) was set so as to attach an ink on a print media in a constant amount of ink attachment, by changing the driving voltage of the piezo element in a manner to make the ink discharging amount constant. Next, images were formed with the printing mode of the inkjet printing apparatus set to "plain paper-high speed" and "gloss paper-high speed".

<<Scratch Resistance (1): Image Peeling>>

With the printer described above, a 3 cm×3 cm solid image chart was printed on gloss paper (with a basis weight of 180 g/m$^2$, available from Sakurai Co., Ltd., POSTER PAPER MAX) in the "gloss paper-high speed mode" in an amount of ink attachment of 0.96 mg/cm$^2$. After drying, the printed portion was scratched with cotton cloth 5 times in a reciprocating manner, to visually observe image peeling at the printed portion and evaluate scratch resistance (1) according to the criteria described below.

[Evaluation Criteria]

A: There was no image peeling.

B: There was a slight image peeling at only an edge of the image.

C: There was image peeling.

Scratch Resistance (2): Stains on Non-Printed Portion>>

With the printer described above, a 3 cm×3 cm solid image chart was printed on gloss paper (with a basis weight of 180 g/m$^2$, available from Sakurai Co., Ltd., POSTER PAPER MAX) in the "gloss paper-high speed mode" in an amount of ink attachment of 0.96 mg/cm$^2$. After drying, the printed portion was scratched with cotton cloth 5 times in a reciprocating manner, to visually observe stains on the non-printed portion due to extension or transfer of the image and evaluate scratch resistance (2) according to the criteria described below.

[Evaluation Criteria]

A: There were no stains.

B: There were a few stains.

C: There were stains.

<Discharging Stability>

A chart that was generated with MICROSOFT WORD 2000 (available from Microsoft Corporation) for fully painting 5 percent of the area of A4 size paper with a solid image for each color was printed continuously on 200 sheets of MY PAPER (available from Ricoh Company, Ltd.), and discharging stability was evaluated according to the criteria described below based on discharging disorder of each nozzle after printing. The printing mode used was a "plain paper-standard or quick" mode modified to "without chromatic compensation" by user setting for plain paper made through a driver provided as an attachment to the printer.

[Evaluation Criteria]

A: There was no discharging disorder.

B: There was slight discharging disorder.

C: There was discharging disorder, or there was a portion that failed to discharge.

TABLE 1

|  |  | Example | | | | |
|---|---|---|---|---|---|---|
|  |  | 1 | 2 | 3 | 4 | 5 |
| Coloring material | Self-dispersible pigment dispersion liquid (Preparation example1) | 37.50 | 37.50 | 37.50 | 37.50 | 37.50 |
|  | Resin-coated pigment dispersion liquid (Preparation example 2) | — | — | — | — | — |

TABLE 1-continued

|  |  |  |  | Example | | | | |
|---|---|---|---|---|---|---|---|---|
|  |  |  |  | 1 | 2 | 3 | 4 | 5 |
| Resin particles | Urethane resin water dispersion (Preparation example 3) |  |  | 10.00 | 7.00 | 10.75 | 6.85 | 10.00 |
|  | Urethane-modified acrylic resin water dispersion (Preparation example 4) |  |  | 2.63 | 5.79 | 1.84 | 5.95 | 2.63 |
| Amine compound |  | Boiling point (degrees C.) | Molecular weight | — | — | — | — | — |
|  | Diethylamine | 55 | 73 | — | — | — | — | — |
|  | Triethylamine | 89 | 101 | — | — | — | — | — |
|  | Dimethylethanolamine | 133 | 89 | — | — | — | — | — |
|  | Aminomethylpropanol | 165 | 89 | 0.50 | 0.50 | 0.50 | 0.50 | 4.90 |
|  | Piperazine | 144 | 86 | — | — | — | — | — |
|  | Aminomethylpropanol propanediol | 152 | 119 | — | — | — | — | — |
| Organic solvent | 1,3-butanediol |  |  | 20.00 | 20.00 | 20.00 | 20.00 | 20.00 |
|  | 3-methyl-1,3-butanediol |  |  | 10.00 | 10.00 | 10.00 | 10.00 | 10.00 |
|  | Glycerin |  |  | — | — | — | — | — |
|  | Triethylene glycol |  |  | 8.00 | 8.00 | 8.00 | 8.00 | 8.00 |
|  | 2,2,4-trimethyl-1,3-pentanediol |  |  | 2.00 | 2.00 | 2.00 | 2.00 | 2.00 |
| Surfactant | Fluorosurfactant (FS3100) |  |  | 0.50 | 0.50 | 0.50 | 0.50 | 0.50 |
| Water | Highly pure water |  |  | Balance | Balance | Balance | Balance | Balance |
| Total (part by mass) |  |  |  | 100.00 | 100.00 | 100.00 | 100.00 | 100.00 |
| Ratio by mass (amine compound/resin particles): solid content conversion |  |  |  | 0.10 | 0.10 | 0.10 | 0.10 | 0.98 |
| Ratio by mass (resin particles/coloring material): solid content conversion |  |  |  | 0.67 | 0.67 | 0.67 | 0.67 | 0.67 |
| Ratio by mass (urethane-modified acrylic resin particles/urethane resin particles): solid content conversion |  |  |  | 0.25 | 0.79 | 0.16 | 0.83 | 0.25 |
| Evaluation result | Viscosity (mPa · s) (25 degrees C.) |  |  | 8 | 8.1 | 8 | 8.1 | 8.1 |
|  | pH (25 degrees C.) |  |  | 9.5 | 9.6 | 9.5 | 9.5 | 10.4 |
|  | Volume average particle diameter (nm) of solid content in ink |  |  | 108 | 110 | 107 | 111 | 99 |
|  | Flowability after water evaporation |  |  | A | A | A | A | A |
|  | Storage stability |  |  | A | A | A | A | A |
|  | Discharging stability |  |  | A | A | A | A | A |
|  | Scratch resistance (1) |  |  | A | A | A | B | A |
|  | Scratch resistance (2) |  |  | A | A | B | A | A |

TABLE 2

|  |  |  |  | Example | | | | |
|---|---|---|---|---|---|---|---|---|
|  |  |  |  | 6 | 7 | 8 | 9 | 10 |
| Coloring material | Self-dispersible pigment dispersion liquid (Preparation example1) |  |  | 37.50 | 37.50 | 37.50 | 37.50 | 37.50 |
|  | Resin-coated pigment dispersion liquid (Preparation example 2) |  |  | — | — | — | — | — |
| Resin particles | Urethane resin water dispersion (Preparation example 3) |  |  | 10.00 | 10.00 | 10.00 | 20.00 | 31.50 |
|  | Urethane-modified acrylic resin water dispersion (Preparation example 4) |  |  | 2.63 | 2.63 | 2.63 | 5.26 | 8.28 |
| Amine compound |  | Boiling point (degrees C.) | Molecular weight | — | — | — | — | — |
|  | Diethylamine | 55 | 73 | — | — | — | — | — |
|  | Triethylamine | 89 | 101 | — | — | — | — | — |
|  | Dimethylethanolamine | 133 | 89 | — | — | — | — | — |
|  | Aminomethylpropanol | 165 | 89 | 0.30 | 5.50 | 0.15 | 1.00 | 1.58 |
|  | Piperazine | 144 | 86 | — | — | — | — | — |
|  | Aminomethylpropanol propanediol | 152 | 119 | — | — | — | — | — |

TABLE 2-continued

|  |  | Example |  |  |  |  |
|---|---|---|---|---|---|---|
|  |  | 6 | 7 | 8 | 9 | 10 |
| Organic solvent | 1,3-butanediol | 20.00 | 20.00 | 20.00 | 15.00 | 10.00 |
|  | 3-methyl-1,3-butanediol | 10.00 | 10.00 | 10.00 | 10.00 | 10.00 |
|  | Glycerin | — | — | — | — | — |
|  | Triethylene glycol | 8.00 | 8.00 | 8.00 | 8.00 | 8.00 |
|  | 2,2,4-trimethyl-1,3-pentanediol | 2.00 | 2.00 | 2.00 | 2.00 | 2.00 |
| Surfactant | Fluorosurfactant (FS3100) | 0.50 | 0.50 | 0.50 | 0.50 | 0.50 |
| Water | Highly pure water | Balance | Balance | Balance | Balance | Balance |
| Total (part by mass) |  | 100.00 | 100.00 | 100.00 | 100.00 | 100.00 |
| Ratio by mass (amine compound/resin particles): solid content conversion |  | 0.06 | 1.10 | 0.03 | 0.10 | 0.10 |
| Ratio by mass (resin particles/coloring material): solid content conversion |  | 0.67 | 0.67 | 0.67 | 1.33 | 2.10 |
| Ratio by mass (urethane-modified acrylic resin particles/urethane resin particles): solid content conversion |  | 0.25 | 0.25 | 0.25 | 0.25 | 0.25 |
| Evaluation result | Viscosity (mPa · s) (25 degrees C.) | 8.2 | 8.1 | 8 | 8.21 | 8.35 |
|  | pH (25 degrees C.) | 9.1 | 10.8 | 9 | 9.8 | 9.9 |
|  | Volume average particle diameter (nm) of solid content in ink | 110 | 100 | 115 | 110 | 112 |
|  | Flowability after water evaporation | A | A | A | A | B |
|  | Storage stability | A | B | A | A | B |
|  | Discharging stability | A | B | B | A | B |
|  | Scratch resistance (1) | A | A | A | A | A |
|  | Scratch resistance (2) | B | B | B | A | A |

TABLE 3

|  |  |  |  | Example |  |  |  |
|---|---|---|---|---|---|---|---|
|  |  |  |  | 11 | 12 | 13 | 14 |
| Coloring material | Self-dispersible pigment dispersion liquid (Preparation example 1) |  |  | 37.50 | 37.50 | 37.50 | — |
|  | Resin-coated pigment dispersion liquid (Preparation example 2) |  |  | — | — | — | 47.00 |
| Resin particles | Urethane resin water dispersion (Preparation example 3) |  |  | 0.67 | 10.00 | 10.00 | 11.25 |
|  | Urethane-modified acrylic resin water dispersion (Preparation example 4) |  |  | 0.18 | 2.63 | 2.63 | 2.96 |
| Amine compound |  | Boiling point (degrees C.) | Molecular weight | — | — | — | — |
|  | Diethylamine | 55 | 73 | — | — | — | — |
|  | Triethylamine | 89 | 101 | — | — | — | — |
|  | Dimethylethanolamine | 133 | 89 | — | 0.50 | — | — |
|  | Aminomethylpropanol | 165 | 89 | 0.03 | — | — | 0.50 |
|  | Piperazine | 144 | 86 | — | — | 0.50 | — |
|  | Aminomethylpropanol propanediol | 152 | 119 | — | — | — | — |
| Organic solvent | 1,3-butanediol |  |  | 25.00 | 20.00 | 20.00 | 20.00 |
|  | 3-methyl-1,3-butanediol |  |  | 15.00 | 10.00 | 10.00 | 10.00 |
|  | Glycerin |  |  | — | — | — | 8.00 |
|  | Triethylene glycol |  |  | 8.00 | 8.00 | 8.00 | — |
|  | 2,2,4-trimethyl-1,3-pentanediol |  |  | 2.00 | 2.00 | 2.00 | 2.00 |
| Surfactant | Fluorosurfactant (FS3100) |  |  | 0.50 | 0.50 | 0.50 | 0.50 |
| Water | Highly pure water |  |  | Balance | Balance | Balance | Balance |
| Total (part by mass) |  |  |  | 100.00 | 100.00 | 100.00 | 100.00 |
| Ratio by mass (amine compound/resin particles): solid content conversion |  |  |  | 0.10 | 0.10 | 0.10 | 0.09 |
| Ratio by mass (resin particles/coloring material): solid content conversion |  |  |  | 0.04 | 0.67 | 0.67 | 0.80 |
| Ratio by mass (urethane-modified acrylic resin particles/urethane resin particles): solid content conversion |  |  |  | 0.25 | 0.25 | 0.25 | 0.25 |
| Evaluation result | Viscosity (mPa · s) (25 degrees C.) |  |  | 7.75 | 8.1 | 8 | 8.4 |
|  | pH (25 degrees C.) |  |  | 9 | 9.6 | 9.6 | 9.5 |
|  | Volume average particle diameter (nm) of solid content in ink |  |  | 108 | 110 | 108 | 99 |
|  | Flowability after water evaporation |  |  | A | A | A | A |
|  | Storage stability |  |  | A | A | A | A |

TABLE 3-continued

|  | Example | | | |
|---|---|---|---|---|
|  | 11 | 12 | 13 | 14 |
| Discharging stability | A | A | A | A |
| Scratch resistance (1) | B | A | A | A |
| Scratch resistance (2) | B | A | A | A |

TABLE 4

| | | | Comparative Example | | | | |
|---|---|---|---|---|---|---|---|
| | | | 1 | 2 | 3 | 4 | 5 |
| Coloring material | Self-dispersible pigment dispersion liquid (Preparation example1) | | 37.50 | 37.50 | 37.50 | 37.50 | 37.50 |
| | Resin-coated pigment dispersion liquid (Preparation example 2) | | — | — | — | — | — |
| Resin particles | Urethane resin water dispersion (Preparation example 3) | | 10.00 | 10.00 | 10.00 | 10.00 | — |
| | Urethane-modified acrylic resin water dispersion (Preparation example 4) | | 2.63 | 2.63 | 2.63 | 2.63 | 13.16 |
| Amine compound | | Boiling point (degrees C.) | Molecular weight | — | — | — | — |
| | Diethylamine | 55 | 73 | 0.50 | — | — | — | — |
| | Triethylamine | 89 | 101 | — | 0.50 | — | — | — |
| | Dimethylethanolamine | 133 | 89 | — | — | — | — | — |
| | Aminomethylpropanol | 165 | 89 | — | — | — | — | 0.50 |
| | Piperazine | 144 | 86 | — | — | — | — | — |
| | Aminomethylpropanol propanediol | 152 | 119 | — | — | 0.50 | — | — |
| Organic solvent | 1,3-butanediol | | | 20.00 | 20.00 | 20.00 | 20.00 | 20.00 |
| | 3-methyl-1,3-butanediol | | | 10.00 | 10.00 | 10.00 | 10.00 | 10.00 |
| | Glycerin | | | — | — | — | — | — |
| | Triethylene glycol | | | 8.00 | 8.00 | 8.00 | 8.00 | 8.00 |
| | 2,2,4-trimethyl-1,3-pentanediol | | | 2.00 | 2.00 | 2.00 | 2.00 | 2.00 |
| Surfactant | Fluorosurfactant (FS3100) | | | 0.50 | 0.50 | 0.50 | 0.50 | 0.50 |
| Water | Highly pure water | | | Balance | Balance | Balance | Balance | Balance |
| Total (part by mass) | | | | 100.00 | 100.00 | 100.00 | 100.00 | 100.00 |
| Ratio by mass (amine compound/resin particles): solid content conversion | | | | 0.10 | 0.10 | 0.10 | — | 0.10 |
| Ratio by mass (resin particles/coloring material): solid content conversion | | | | 0.67 | 0.67 | 0.67 | 0.67 | 0.67 |
| Ratio by mass (urethane-modified acrylic resin particles/urethane resin particles): solid content conversion | | | | 0.25 | 0.25 | 0.25 | 0.25 | — |
| Evaluation result | Viscosity (mPa·s) (25 degrees C.) | | | 8.2 | 8 | 8.2 | 8 | 8 |
| | pH (25 degrees C.) | | | 9.5 | 9.7 | 9.5 | 7.6 | 9.5 |
| | Volume average particle diameter (nm) of solid content in ink | | | 106 | 114 | 118 | 125 | 108 |
| | Flowability after water evaporation | | | C | C | C | C | B |
| | Storage stability | | | B | B | B | C | B |
| | Discharging stability | | | C | C | C | C | B |
| | Scratch resistance (1) | | | B | B | B | C | C |
| | Scratch resistance (2) | | | B | B | B | C | A |

Aspects of the present disclosure are as follows, for example.

<1> An ink including:
a coloring material;
an organic solvent;
resin particles;
an amine compound; and
water,
wherein the resin particles include urethane resin particles, and urethane-modified acrylic resin particles including a core portion containing an acrylic resin and a shell portion formed on a surface of the core portion and containing at least a urethane resin, and
wherein the amine compound has a boiling point of 120 degrees C. or higher but 200 degrees C. or lower and a molecular weight of 100 or less.

<2> The ink according to <1>,
wherein the amine compound is any one of a compound represented by general formula (I) below, a compound represented by general formula (II) below, and a heterocyclic amine,

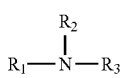

General formula (I)

wherein in general formula (I), $R_1$, $R_2$, and $R_3$ each represent any of a hydrogen atom, an alkoxy group containing from 1 through 4 carbon atoms, an alkyl group containing from 1 through 6 carbon atoms, and a hydroxyethyl group, where a case in which all of $R_1$, $R_2$, and $R_3$ are hydrogen atoms is excluded,

General formula (II)

wherein, in general formula (II), $R_4$, $R_5$, and $R_6$ each represent any of a hydrogen atom, a methyl group, an ethyl group, a hydroxymethyl group, and an alkyl group containing from 1 through 4 carbon atoms.
<3> The ink according to <1> or <2>,
wherein the amine compound is at least one selected from the group consisting of dimethylethanolamine, aminomethylpropanol, and piperazine.
<4> The ink according to any one of <1> to <3>,
wherein a content of the amine compound is 0.01 percent by mass or greater but 5 percent by mass or less.
<5> The ink according: to any one of <1> to <4>,
wherein the urethane resin particles are of any of polycarbonate urethane resin and polyester urethane resin.
<6> The ink according to any one of <1> to <5>,
wherein a volume average particle diameter of the urethane resin particles is 10 nm or greater but 100 nm or less.
<7> The ink according to any one of <1> to <6>,
wherein when a content of the resin particles in the ink is assumed to be 1 part by mass, a content of the amine compound in the ink is 0.05 parts by mass or greater but 1 part by mass or less.
<8> The ink according to any one of <1> to <7>,
wherein when a content of the urethane resin particles in the ink is assumed to be 1 part by mass, a content of the urethane-modified acrylic resin particles in the ink is 0.2 parts by mass or greater but 0.8 parts by mass or less.
<9> The ink according to any one of <1> to <8>,
wherein the coloring material is a self-dispersible coloring material containing a functional group.
<10> The ink according to any one of <1> to <8>,
wherein the coloring material is a resin-coated coloring material.
<11> The ink according to any one of <1> to <10>,
wherein when a content of the coloring material in the ink is assumed to be 1 part by mass, a content of the resin particles in the ink is 0.05 parts by mass or greater but 2 parts by mass or less.
<12> The ink according to any one of <1> to <11>, further including a surfactant.
<13> The ink according to <12>,
wherein the surfactant is a fluorosurfactant.
<14> An ink stored container including:
the ink according to any one of <1> to <13>; and
an ink storage storing the ink.
<15> An image forming method including
an ink discharging step of applying a stimulus to the ink according to any one of <1> to <13> to discharge the ink to print an image.
<16> The image forming method according to <15>,
wherein the stimulus is at least one selected from heat, pressure, vibration, and light.
<17> A liquid discharging apparatus including
an ink discharging unit configured to apply a stimulus to the ink according to any one of <1> to <13> to discharge the ink to print an image.
<18> The liquid discharging apparatus according to <17>,
wherein the stimulus is at least one selected from heat, pressure, vibration, and light.
<19> An image on a print medium, the image including:
a coloring material;
resin particles; and
an amine compound,
wherein the resin particles include urethane resin particles, and urethane-modified acrylic resin particles including a core portion containing an acrylic resin and a shell portion formed on a surface of the core portion and containing at least a urethane resin, and
wherein the amine compound has a boiling point of 120 degrees C. or higher but 200 degrees C. or lower and a molecular weight of 100 or less.
<20> The image according to <19>,
wherein the print medium is plain paper, gloss paper, or plain paper and gloss paper.

The ink according to any one of <1> to <13>, the ink stored container according to <14>, the image forming method according to <15> or <16>, the liquid discharging apparatus according to <17> or <18>, and the image according to <19> or <20> can solve the various problems in the related art and achieve the object of the present disclosure.

What is claimed is:
1. An ink comprising:
a coloring material;
an organic solvent comprising a polyol having a solubility parameter (SP value) in a range of from 11.8 to 14.0;
resin particles;
an amine compound; and
water,
wherein a total content of the polyol, the organic solvent, and any additional organic solvent present in the ink is from 30% by mass to 50% by mass based on a total mass of the ink,
wherein the resin particles comprise:
urethane resin particles, and
urethane-modified acrylic resin particles that comprise a core portion comprising an acrylic resin and a shell portion formed on a surface of the core portion and comprising at least a urethane resin, a content of the urethane resin particles being from 1% by mass to 10% by mass based on the total mass of the ink, and
wherein the amine compound has a boiling point of from 120° C. to 200° C. and a molecular weight of 100 or less wherein when a content of the urethane resin particles in the ink is 1 part by mass, a content of the urethane-modified acrylic resin particles in the ink is from 0.2 parts by mass to 0.8 parts by mass.
2. The ink according to claim 1, wherein when a content of the resin particles in the ink is 1 part by mass, a content of the amine compound in the ink is from 0.05 parts by mass to 1 part by mass.
3. The ink according to claim 1, wherein the coloring material comprises a self-dispersible coloring material that comprises a hydrophilic functional group.
4. The ink according to claim 1, wherein the coloring material comprises a resin-coated coloring material.
5. The ink according to claim 1, wherein when a content of the coloring material in the ink is 1 part by mass, a content of the resin particles in the ink is from 0.05 parts by mass to 2 parts by mass.

6. The ink according to claim 1, wherein the urethane resin is a polycarbonate urethane resin or a polyester urethane resin.

7. The ink according to claim 1, wherein a content of the amine compound is from 0.05% by mass to 2% by mass based on the total mass of the ink.

8. The ink according to claim 1, wherein the polyol of the organic solvent is selected from the group consisting of 3-methyl-1,3-butanediol, 1,2-butanediol, 1,3-butanediol, 1,4-butanediol, 2,3-butanediol, 1,2-propanediol, and 1,3-propanediol.

9. An ink stored container comprising:
the ink according to claim 1; and
an ink storage storing the ink.

10. An image forming method comprising:
applying a stimulus to the ink according to claim 1 so as to discharge the ink to print an image.

11. A liquid discharging apparatus comprising:
an ink discharging unit configured to apply a stimulus to an ink to discharge the ink to print an image,
wherein the ink comprises:
a coloring material;
an organic solvent comprising a polyol having a solubility parameter (SP value) in a range of from 11.8 to 14.0;
resin particles;
an amine compound; and
water,
wherein a total content of the polyol, the organic solvent, and any additional organic solvent present in the ink is from 30% by mass to 50% by mass based on a total mass of the ink,
wherein the resin particles comprise:
urethane resin particles, and
urethane-modified acrylic resin particles that comprise a core portion comprising an acrylic resin and a shell portion formed on a surface of the core portion and comprising at least a urethane resin,
a content of the urethane resin particles being from 1% by mass to 10% by mass based on the total mass of the ink, and
wherein the amine compound has a boiling point of from 120° C. to 200° C. and a molecular weight of 100 or less wherein when a content of the urethane resin particles in the ink is 1 part by mass, a content of the urethane-modified acrylic resin particles in the ink is from 0.2 parts by mass to 0.8 parts by mass.

12. An image on a print medium, the image comprising:
a coloring material;
resin particles; and
an amine compound,
wherein the resin particles comprise:
urethane resin particles, and
urethane-modified acrylic resin particles that comprise a core portion comprising an acrylic resin and a shell portion formed on a surface of the core portion and comprising at least a urethane resin,
a content of the urethane resin particles is from 1% by mass to 10% by mass based on a total mass of the ink, and
wherein the amine compound has a boiling point of from 120° C. to 200° C. and a molecular weight of 100 or less wherein when a content of the urethane resin particles in the ink is 1 part by mass, a content of the urethane-modified acrylic resin particles in the ink is from 0.2 parts by mass to 0.8 parts by mass.

* * * * *